United States Patent
Taylor

(10) Patent No.: US 7,681,016 B2
(45) Date of Patent: Mar. 16, 2010

(54) MICROPROCESSOR INSTRUCTION EXECUTION METHOD FOR EXPLOITING PARALLELISM BY TIME ORDERING OPERATIONS IN A SINGLE THREAD AT COMPILE TIME

(75) Inventor: Richard Michael Taylor, Midlothian (GB)

(73) Assignee: Critical Blue Ltd., Edinburgh (GB)

( * ) Notice: Subject to any disclaimer, the term of this patent is extended or adjusted under 35 U.S.C. 154(b) by 0 days.

(21) Appl. No.: 10/518,974

(22) PCT Filed: Jun. 30, 2003

(86) PCT No.: PCT/GB03/02820

§ 371 (c)(1),
(2), (4) Date: Dec. 21, 2004

(87) PCT Pub. No.: WO2004/003731

PCT Pub. Date: Jan. 8, 2004

(65) Prior Publication Data

US 2005/0228976 A1    Oct. 13, 2005

(30) Foreign Application Priority Data

Jun. 28, 2002    (GB)    ............... 0215029.0

(51) Int. Cl.
*G06F 9/00*    (2006.01)
(52) U.S. Cl. .................. 712/220; 712/233; 717/149
(58) Field of Classification Search ......... 712/229, 712/233, 216, 218, 220; 717/140, 149
See application file for complete search history.

(56) References Cited

U.S. PATENT DOCUMENTS

| | | | | |
|---|---|---|---|---|
| 4,847,755 A | * | 7/1989 | Morrison et al. | 712/203 |
| 5,193,180 A | * | 3/1993 | Hastings | 717/163 |
| 6,233,678 B1 | * | 5/2001 | Bala | 712/240 |
| 6,289,442 B1 | * | 9/2001 | Asato | 712/239 |
| 7,055,021 B2 | * | 5/2006 | Kadambi | 712/217 |

FOREIGN PATENT DOCUMENTS

| | | |
|---|---|---|
| EP | 081 0519 A2 | 5/1997 |
| EP | 1 050 811 A1 | 5/1999 |
| WO | WO 03/040916 A1 | 5/2003 |

OTHER PUBLICATIONS

Hideki Ando, Chikako Nakanishi, Tetsuya Hara, Masao Nakaya; "Unconstrained Speculative Execution with Predicated State Buffering"; System LSI Laboratory; Mitsubishi Electric Corporation; 22nd ISCA, pp. 126-137, Jun. 1993.

Dionisios N. Pnevmatikatos; Gurinder S. Sohi; "Guarded Execution and Branch Prediction in Dynamic ILP Processors"; Computer Sciences Department; University of Wisconsin-Madison; pp. 120-129.

Marc Tremblay; Jeffrey Chan; Shailender Chaudhry; Andrew W. Conigliaro; Shing Sheung Tse; "The MAJC Architecture: A Synthesis of Parallelism and Scalability"; Nov.-Dec.,IEEE Micro; pp. 12-25.

Jenn-Yuan Tsai; Pen-Chung Yew; "Ehancing Multiple-Path Speculative Execution with Predicate Window Shifting"; pp. 0-27.

* cited by examiner

*Primary Examiner*—David J Huisman
(74) *Attorney, Agent, or Firm*—Saul Ewing LLP

(57) ABSTRACT

A low overhead mechanism for supporting speculative execution and code compression in a Very Long Instruction Word (VLIW) microprocessor. Profitable speculations can be determined statically at compile time and a low overhead hardware recovery mechanism used that does not require compensation code.

27 Claims, 25 Drawing Sheets

MICROPROCESSOR INSTRUCTION EXECUTION METHOD FOR EXPLOITING PARALLELISM BY TIME ORDERING OPERATIONS IN A SINGLE THREAD AT COMPILE TIME

CROSS REFERENCE TO RELATED APPLICATIONS

This application claims the priority of PCT/GB03/002820 filed Jun. 30, 2003 and British Application GB 0215029.0 filed on Jun. 28, 2002, the contents of which are hereby incorporated by reference.

TECHNICAL FIELD

The present invention is in the field of digital computing systems. In particular, it relates to a method of efficient instruction execution in a microprocessor system.

BACKGROUND ART

Very Long Instruction Word (VLIW) microprocessor architectures are able to perform a large number of parallel operations on each dock cycle. However, the characteristic of most non-numerical code is that there are a large number of potential dependencies between instructions. That is, one instruction is reliant upon the results of a previous instruction and so cannot be executed concurrently with it. This means that the instruction stream often becomes sparse with many functional units unused during many cycles.

A significant contributor to this restriction is the memory alias problem. In languages such as C or C++ there is heavy usage of pointer memory accesses. It is extremely difficult, and often impossible, to trace data flow within a program at compilation time to determine the set of objects that a particular pointer might access at any particular time. This imposes severe restrictions on performing load and store operations out-of-order. Whenever a store operation is performed via a pointer it could potentially write to any address. Thus subsequent loads cannot be moved earlier than the store in case they are "aliased" with the store. This severely restricts parallelism since, in most cases, the memory accesses are not actually aliased.

Some high end processors have hardware blocks that analyze the addresses for stores as they are calculated during program execution. They can then be compared against subsequent loads. This allows greater parallelism as loads can be issued earlier than the store. If there is an address match then the hardware takes corrective action, such as re-executing the load after the store is complete. However, such processors are extremely complex and are not suitable for lower cost embedded applications. Some architecture/compiler combinations can generate code to statically issue loads before potentially aliased stores. Additional code is then generated to later compare the addresses and branch to special compensation code to preserve correct program semantics in the unlikely event that the accesses are indeed aliased. Unfortunately this adds significant code size overhead and can only be used in limited cases.

A further constraint on parallelism is the number of branches that occur within code. In non numeric applications, a conditional branch operation is generally performed every few instructions. A branch causes divergence of the possible instruction streams so that different operations are performed depending on the condition. This also restricts the number of parallel operations on a VLIW processor. Branches also cause problems with the operation of the pipelines used in processors. These pipelines fetch instructions several dock cycles before the instructions are actually executed. If that is dependent on some condition that is only calculated just before the branch then it is difficult to avoid a pipeline stall. During a stall the processor performs no useful work for several cycles until the correct instruction is fetched and works its way down the pipeline.

Most high-end processors include some form of branch prediction scheme. There are many levels of solution complexity, but all try and guess which way a particular branch will go on the basis of compiler analysis and the history of which way the branch has gone in the past. Many of these processors can then speculatively execute code on the assumption the branch will go a particular way. The results from this speculative execution can then be undone (or squashed) should the assumption prove to be incorrect. Some processors have a predicated execution mechanism. This allows some branches to be simplified by eliminating the branch and executing its target code conditionally. However, this technique can generally only be applied to a limited set of branches in code.

SUMMARY OF THE INVENTION

The preferred embodiment performs all execution within code blocks called regions. A region is simply a fixed sequence of execution words. Each individual word may encode multiple individual operations. No branches are performed during the execution of a region. Instead, multiple potential branch destinations may be evaluated during the execution of the region. When the end of a region is reached the code will branch to a successor region. Thus only one actual branch is executed per region.

A region is constructed from a sequence of contiguous instructions from an original sequential representation of a program. This sequence may be subdivided into a number of "strands". Each strand is a subset of instructions from the region. The strands are numbered in terms of their original order in the sequential program representation. To maintain the original program semantics the dependencies between operations in different strands must be observed as though they were being executed in the original strand order.

The preferred embodiment provides much greater scope for allowing the reordering of operations belonging to different strands. If necessary the dependencies between operations in different strands can be violated. The architecture contains hardware mechanisms to recover from such an event and ultimately produce the correct results. Importantly, the hardware overhead to achieve this is small in comparison to other processor architectures that support "Out-of-Order" execution.

The code generator can generate a code sequence that mixes operations as appropriate from different strands. Internal strand dependencies are maintained but if there are unused functional units in a particular execution word then appropriate operations can be selected from other strands. In this way each of the functional units can be kept busy for a much higher percentage of the time and the instances of unused units are significantly reduced.

The execution of each strand is conditional. An operation in one strand can cause a later stand to be squashed. If a strand is squashed then all the results it generates are nullified, as though it has not been executed at all. Many control flow constructs can be implemented using strands. For instance, if a branch conditionally jumps over a block of code then that code can be formed into a strand. Its execution is made conditional on the inverse of the same calculation previously used for the conditional branch.

Multiple strands within a region can be used to represent control flow of arbitrary complexity, including if-then-else constructs and conditional strands within other conditional strands. All this conditional execution can be performed using the static schedule of operations and without any complex hardware or branches that would upset the efficiency of the processor pipeline.

To improve operation parallelism a load from a later strand can be executed before a store from an earlier (i.e. lower numbered strand). Thus calculations for the two strands can proceed in parallel without serialization enforced by any potential address alias. The code includes a special check operation. This is a simple address comparison operation between the store and the load address. If they are not the same then execution of the two strands can continue. If they are identical then the strand containing the later load is aborted. The region may then be re-executed and the earlier load is able to corny load the value generated by the store issued later in the region. This store is temporally earlier as it is from a lower numbered strand.

DESCRIPTION OF PRESENTLY PREFERRED EMBODIMENT

Overview

Figure 1:
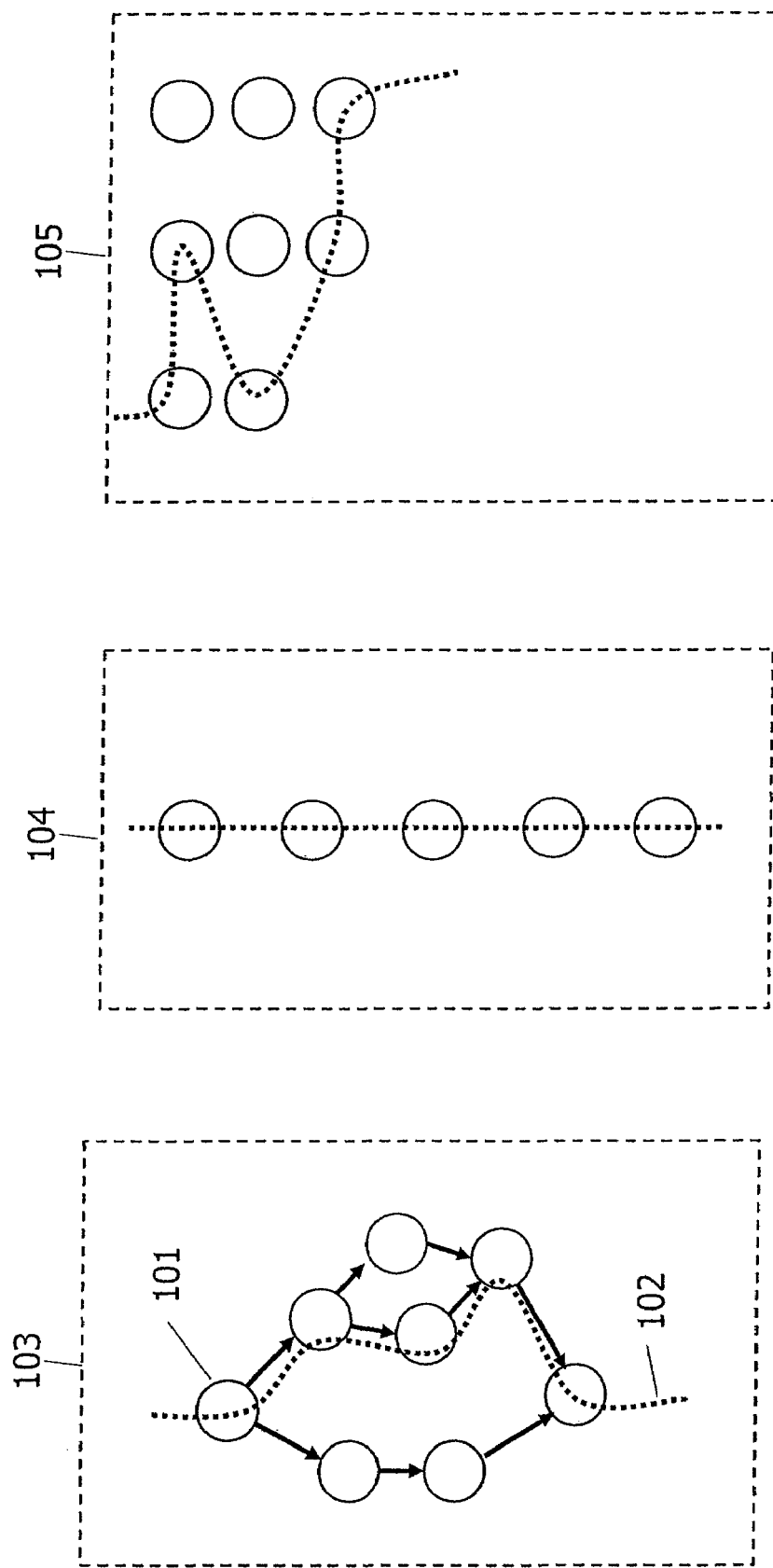
FIG. 1 shows an illustration of how strand based execution allows streams of operations from different basic blocks to be executed in parallel.

One of the key requirements of the architecture is to support scalable parallelism. The basic structure of the micro architecture is focused on that goal. Extracting parallelism from highly numeric loop kernels is relatively straightforward. Such loops have regular computation and access patterns that are easy to analyse. The nature of the algorithms also tends to lend itself well to parallel computation. The architecture needs to balance the availability of computational resources (such as adders, multipliers) and memory units to ensure the tight degree of parallelism can be extracted. Such numeric kernels are common for Digital Signal Processors (DSPs). The loops tend to lack any complex control flow. Thus DSPs tend to be highly efficient at regular computation loops but are very poor at handling code with more complicated control flow.

Other than in numeric computation loops, C and C++ code tends to be filled with complicated control flow structures. This is simply because most control code is filled with conditional statements and short loops. Most C++ code is also filled with references to main memory via pointers. The result is a code stream from which it is extremely difficult to extract useful amounts of parallelism. In average Reduced Instruction Set Computer (RISC) code, approximately 30% of all instructions are memory references and a branch is encountered every 5 instructions.

High end processors have to deal with this kind of code and extract parallelism from it in order to achieve competitive performance. The complexity of such processors has mushroomed in recent years to try and deal with this issue. The control logic of such processors has literally millions of transistors dedicated to the task of extracting parallelism from the code being executed. The extra hardware needed to actually perform the operations in parallel is tiny in comparison with the logic required to find and control them. The main method utilised is to support dynamic out-of-order and speculative execution. This allows the processor to execute instructions in a different order from that specified by the program. It can also execute those instructions speculatively, before it is known for sure whether they should be executed at all. This allows parallelism to be extracted across branches. The difficult constraint is that the execution must always produce exactly the same answer as would result if the instructions were executed strictly one by one in the original order.

The control and complexity overheads of dynamic out-of-order execution are far too high for the application areas of the preferred embodiment. The intended application areas are embedded systems where there are code sequences which contain significant potential parallelism and where the repetition of those sequences represents a high percentage of the execution time of the processor. There is a significant cost overhead due to the area occupied by the control logic and the cost of designing it. Additionally, such logic is not amenable to the scalability requirements of the architecture.

A number of recent developments in the area of micro architecture have been focused on VLIW type architectures. There is a "back to basics" movement that seeks to place the burden of extracting parallelism on the compiler. The compiler is able to perform much greater analysis to seek parallelism in the application. It is also considerably simpler to develop than equivalent control logic. This is because the control logic must find the parallelism as the program is running so must itself be highly pipelined and suffers from the physical constraints of circuit design. The compiler performs all of its analyse before the code is executed with the advantage of much longer analysis time. For most classes of static parallelism, compiler analysis is very effective.

Unfortunately, software analysis is poor at extracting parallelism that can only be determined dynamically. Examples of these are branches and potentially aliased memory accesses. A compiler can know the probability that a particular branch will be taken from profiling information, but it cannot know for sure whether it will be taken on any particular instance. A compiler can also tell from profiling that two memory accesses never seem to access the same memory location, but it cannot prove that will always be the case. Consequently it is not able to move a store operation over a potentially aliased load operation as that might affect the results the program would generate. This restricts the amount of parallelism that can be extracted statically in comparison to that available dynamically.

Strand Execution Model

The preferred embodiment employs a combination of static and dynamic parallelism extraction. This gives the architecture access to high degrees of parallelism without the overhead of complex hardware control structures. The architecture itself is fully static in its execution model. It executes instructions in exactly the order specified by the tools. These instructions may be out of order with respect to the sequential program, if the tools are able to prove that the reordering does not affect the program result. This reordering is called instruction scheduling and is an important optimisation pass for most architectures.

This disclosure presents an execution model that also allows it to perform out-of-order operations that cannot be proved as safe at code generation time. An operation sequence is considered safe if it is guaranteed to produce the same results as the original sequential code under all circumstances. In general it only performs these optimisations if it knows that they will usually be safe at execution time. The hardware is able to detect if the assumptions are wrong and arrange a re-execution of the code that is guaranteed to produce the correct answer in all circumstances. The hardware overhead for this "hazard" detection and re-execution is very small.

FIG. 1 illustrates the execution model of the preferred embodiment. The area 103 shows a representation of a code sequence composed of basic blocks of instructions 101. A basic block is a segment of code that is delineated by a branch operation. The condition upon which the branch is performed is generally calculated in the code of the basic block so it is not possible to know before entering the block which route will be taken. Each execution of the code will produce a particular path of execution through the basic blocks. Certain paths may be considerably more likely than others but any route may be taken. These are related by the branches that may be performed between them. On a given execution a particular path 102 will be taken. The area 104 shows the linear execution of the basic blocks on a sequential processor. Each basic block as to be executed one after the other, as the branches are resolved. The area 105 shows a possible execution of the same code on a processor of the preferred embodiment. Code from different basic blocks may be interleaved to make more efficient use of execution resources with the processor and to more effectively hide the latencies of certain operations. The choice of which operations to perform in parallel is determined at code generation time.

The processor is able to execute code from a number of different basic blocks in parallel. It does this to increase the amount of parallelism and efficiency of the architecture. It might know that one basic block is very likely to follow another. It can pull instructions forward from the second block to execute in parallel with the instructions of the first. This allows calculations to be started earlier (and thus finish earlier) and to more effectively balance the resource utilisation of the processor. The scheduling algorithm does this while taking account of the probability that the execution of a particular instruction will be useful.

Executing code speculatively in this manner normally requires a significant hardware overhead. If a particular block should not have been executed then any results it has produced must be discarded. This is referred to as "squashing" the execution. In particular, any store operations that the code has performed must be undone as they could permanently pollute the memory space with incorrect results. Mechanisms are employed that allow the benefits of speculative execution while only requiring the minimum of hardware overhead.

A strand represents a particular sequential group of operations that is being executed on the machine. Many strands may be executed simultaneously. Each individual operation that is performed belongs to a particular strand. Whenever an execution word is issued it may contain operations that are associated with a number of different strands.

The strand mechanism performs two main purposes:

Firstly, it implements a predicate mechanism. This allows conditional blocks of code to be integrated into a region in which all operations are executed. Each strand has an associated predicate flag. By default this is set to true but the strand may be "squashed" and this flag set to false. If a strand is squashed then all operations from the strand are essentially nullified as if they were never executed. Thus it provides a means to incorporate conditional code into an atomically executed region. Thus the pipeline stall hazards of conditional branches are avoided.

Secondly, it provides a framework to implement a low cost speculative execution mechanism. The code scheduling may make code motions that violate the operation ordering rules for inter-strand dependencies. The hardware incorporates simple detection mechanisms to determine when a dependency hazard has actually occurred. The numbering of the strands is in accordance to the temporal ordering of the operations in the sequential program. This temporal ordering may be at odds with the physical ordering in a code scheduling if some types of speculative code motions have been performed. Since each operation is with the strand to which it belongs it is possible to determine the correct temporal order of operations without any additional hardware analysis or complex instruction reorder buffers. Recovery from a dependency hazard is relatively easily achieved by re-execution of a region. This is done a number of times with certain strands squashed. This allows the original temporal order to be reproduced.

Strand Enabled Parallelism

Figure 2:
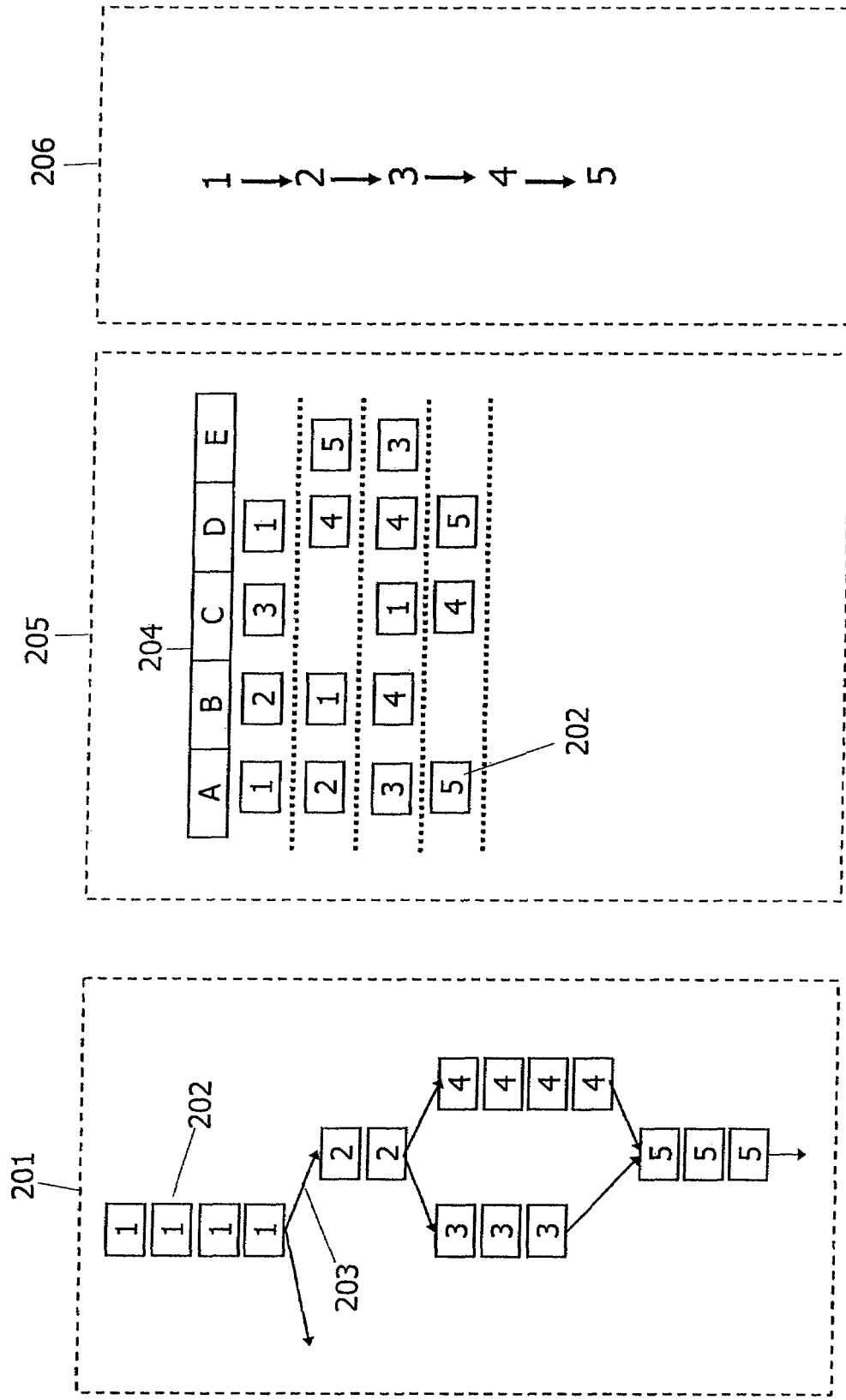
FIG. 2 shows an illustration of how operations from individual basic blocks are extracted and mapped to different strands in a fixed casual ordering.

The use of strands provides significantly improved scope for parallel code instruction execution. FIG. 2 illustrates the relationship between strands and basic blocks:

Area 201 shows the individual operations 202 within the basic blocks as well as the control flow relationships of the basic blocks 203. The last operation of a basic block may be a branch that determines which basic block will be executed next. Each of the basic blocks is allocated a different strand number shown in the blocks 202.

Area 205 shows a potential instruction schedule generated for the processor. Operations 202 from different strands (i.e. basic blocks) may be issued during the same dock cycle. The original strand number is shown in each operation 202. Each of the operations is issued from a particular group within the execution word 204. The order of operations within a particular strand is always maintained. The order of operations between strands does not have to be maintained, allowing much greater scheduling freedom for the architecture. Although the scheduler is able to perform operations out of order between strands it will only do so if that is unlikely to lead to a hazard. The hardware is able to recover from a hazard but there is a performance penalty to doing so.

This mechanism allows instructions to be issued out of order. However, if the correct results are to be produced by the architecture then the data flows between strands that would occur if they were executed in the correct order must be maintained. Area 206 shows that the logical order of the strands is always the same e.g. a result generated by an operation in strand 3 should never influence the calculations performed in strand 2. That could never happen if the instructions were executed in order. In effect the architecture has two different time domains. There is the physical time domain of the order of instruction execution. There is also the logical time domain that was present in the sequential program that must be preserved in order to maintain the sequential program semantics.

Strand Phases

Each strand has three distinct phases of execution that occur during the execution of a region. A strand is initiated in its speculative phase. During this phase operations from the strand may be executed that are either control and/or data speculative. An operation is control speculative if it is executed before it is known whether the strand to which it belongs should be executed at all. An operation is data speculative if it is operating upon data that might not have its correct value as expected at the start point of the strand in the program. Operations issued in the speculative phase of the strand may have to be re-executed any number of times. Thus they may not change the state that may be read by the re-execution, as that would invalidate the results of the second and subsequent executions. For example, register file writes and memory stores may not be executed in the speculative phase of a strand.

At some later point each strand enters a provisional phase. At the start of the provisional phase the squash state of the strand is finalized. In other words, if the strand is going to be squashed then it will have been so by the start of the provisional phase. The strand may only be disabled after it has entered the provisional phase by an earlier branch that would also squash all higher numbered strands. Certain special types of operation may be issued in the provisional phase, such as squash operations and branches.

At some further later point each strand enters a committed phase. During this phase it is known that the strand execution state is definitely in its final form and the entry conditions in terms of register and memory state are correct for the strand's position in the code. Operations that permanently change the machine state may be executed during the committed phase.

The division of strands between the phases allows speculative operations to be performed that can be squashed without permanently changing the machine state. This gives much greater scheduling freedom and thus potential parallelism. Moreover, the mechanism requires very little hardware overhead.

Strand Phase Transition

A strand changes state from its speculative to provisional phase on the first cycle after which all preceding squash operations would have influenced the execution state of the strand. No explicit operation is required to indicate the state transition.

A strand transitions from the provisional to committed phase when all operations that can disable the strand have been executed and have impacted the strand state. Again, there is no requirement for an explicit operation to indicate that the committed phase has been entered.

Figure 3:
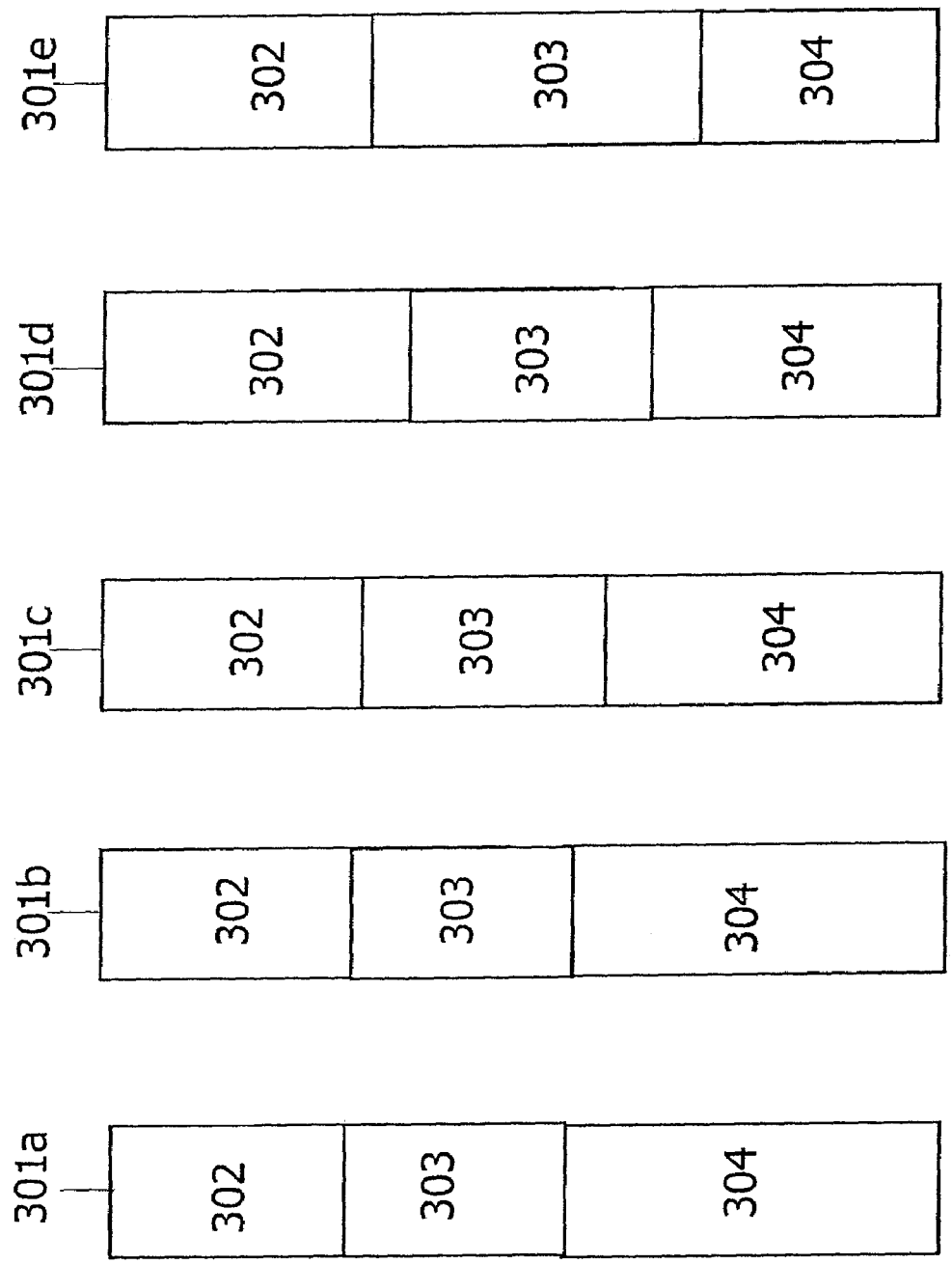
FIG. 3 illustrates the relationship of execution phases within a number of strands.

An illustration of the transition between the phases is shown in FIG. 3. Each of the blocks 301a-e is a separate strand. These strands may be simultaneously active and operations may be issued from each of the strands in an interleaved manner. Each strand may have up to three different phases that determine the type of operations that may be issued in the strand. The order of the phases is fixed and transitions from speculative 302, provisional 303 and committed 304.

Region Based Execution

A region is a group of consecutive execution words to be executed as an atomic unit. Execution of a region may only enter with the first execution word and may only exit at the last word. Thus all words within a region are always executed if the region is entered. This property considerably simplifies the code generation and scheduling process.

Within a particular region a number of branches may be issued. The branches do not have any effect until the end of the region is reached. At that point the hardware is able to resolve between many possible following regions. Thus the hardware handles a multi-way branch. Collapsing multiple branches into a single decision point allows the architecture to execute code efficiently without the need for complex branch prediction mechanisms.

The region is a fundamental building block for the architecture, both during the code generation process and during code execution. Each software function is composed of one or more regions. A region is the basic unit of execution granularity. A region may only be entered via its first execution word and all execution words within it will be executed. A number of branches may be issued and they are resolved so that a single succession region is selected at the end of the region execution.

All strands are limited to the lifetime of a single region. The architecture is able to execute operations out of order within a particular region. Out of order execution and any resulting hazards are resolved at the end of the region and then execution continues on to another region, which may itself issue operations out of order.

Figure 5:
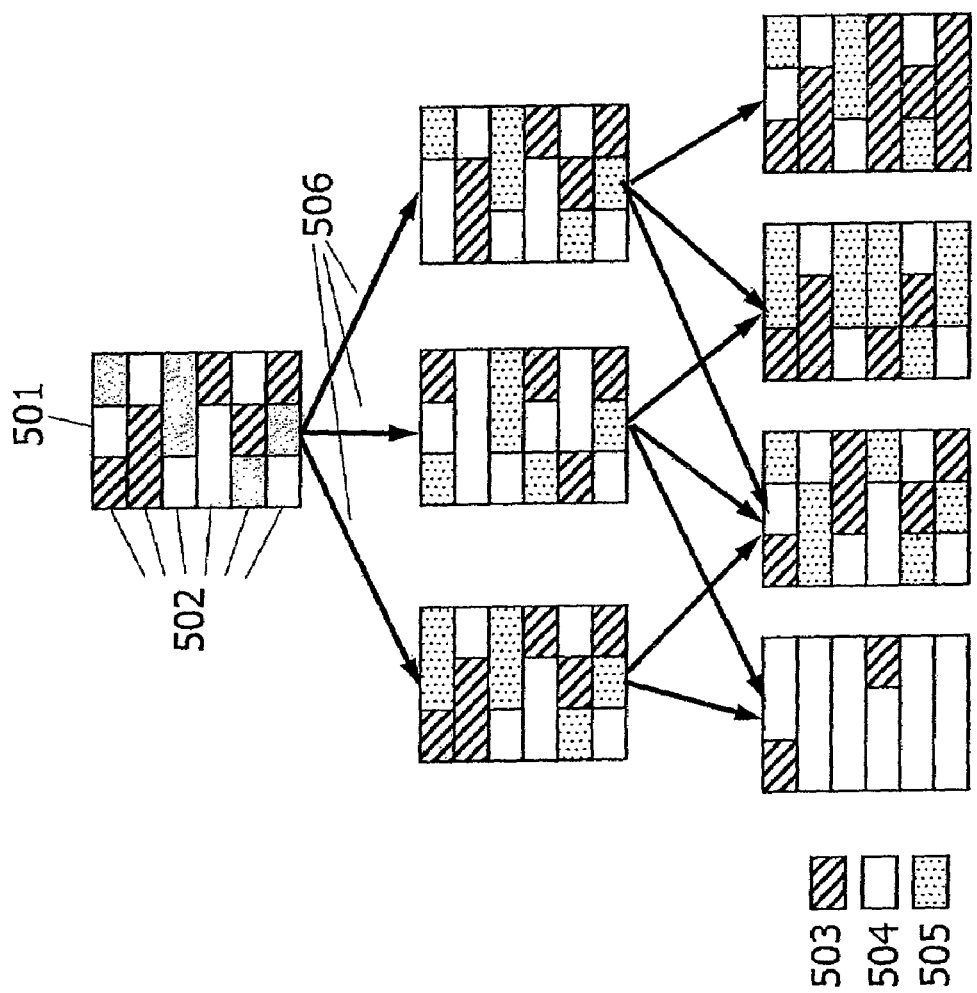
FIG. 5 shows a representation of the relationship between individual regions and the strands therein.

FIG. 5 illustrates an example set of regions and the relationships between them. It shows the execution of the individual strands within each region. There are a number of regions 501 composed of individual execution words 502. Within each region there may be multiple strands 503, 504 and 505. The number of strands is only limited by the code and the capability of the hardware. Each region may have a number of possible successor regions 506 depending on the branch that is taken.

If a hazard is detected during execution then the sequential semantics of the strands have not been properly preserved. The architecture must be able to recover from this situation with as little overhead as possible.

Upon detecting a hazard in a particular strand the results generated for that and any later (i.e. higher numbered) strands may be incorrect. The architecture allows execution to continue until the end of the region, when the strands will be completed. Any results from the hazard, and any higher, strands are discarded. The architecture then re-executes the code from the start of the region again. Since lower numbered strands have already been successfully completed they are not executed a second time. The architecture includes logic to block operations from those strands. Since the lower strands have completed and generated their results the hazard strand is able to execute correctly, utilizing any required results from the lower strands. If another, even higher numbered, strand generates a hazard then the region may be repeated a second time and so on. When all strands have successfully completed the processor may move onto the successor region.

The goal of the architecture is to execute all strands successfully on the first attempt. The compiler does extensive analysis to ensure that the chances of hazards are small. The key is that the compiler doesn't have to prove that a hazard cannot happen. The re-execution mechanism will ensure correct completion of the strands if required. It does this with a minimum of hardware overhead. The size of regions is limited to a few tens of instructions so that the overhead of any re-execution of the region is not too great.

Squash Mechanism

This section describes the operation of the squash mechanism in more detail. A squash is an operation that may be issued that impacts the status of other strands. The squash is conditional (i.e. the squash only occurs if a certain condition evaluates to true). This mechanism allows strands to be dynamically squashed on the basis of dynamic data and thus influence the execution of other operations. In effect this allows conditional code that might otherwise be branched around due to a condition to be folded into a single contiguous stream of operations.

Figure 6:
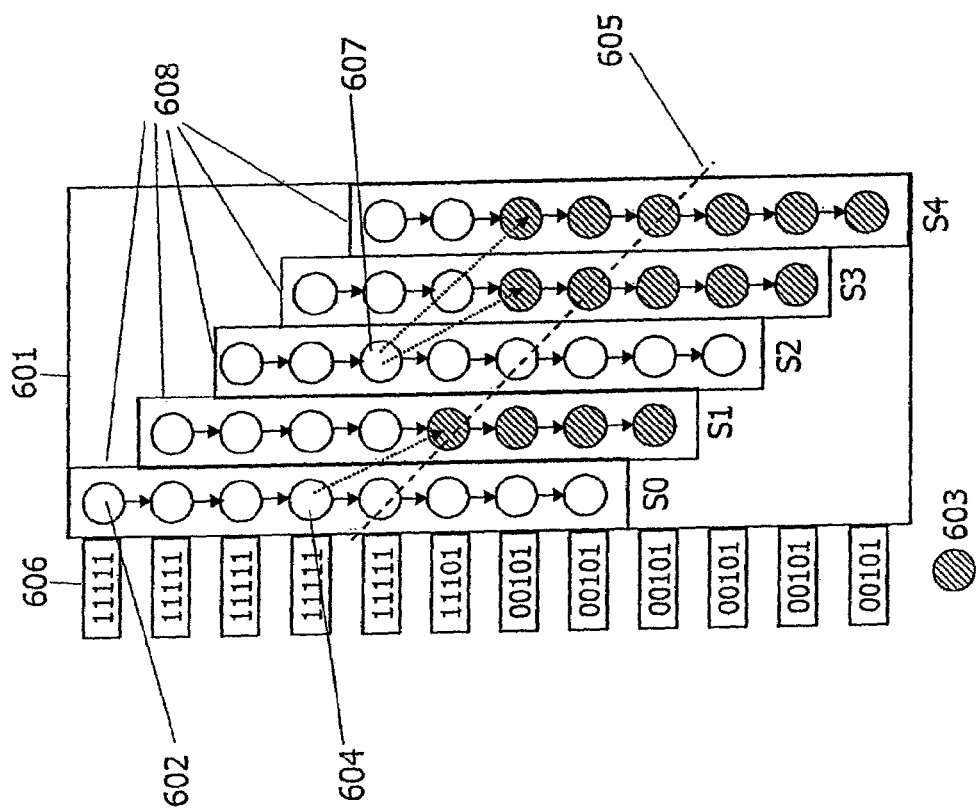
FIG. 6 indicates how individual squashes executed in one strand can impact the execution of another strand.

FIG. 6 illustrates the squash mechanism. The box 601 represents a region composed of individual operations 602. Each of the operations belongs to one of a number of strands 608 within the region. A strand itself is composed of a number of individual operations that communicate via data flow. In general an operation from any strand can be issued at any point during the region execution. However, there may be ordering dependencies between strands that result in operations from higher strands being issued later in the region schedule. The goal of the scheduling process is to overlap the execution of multiple strands.

A global strand state 606 is shown after each execution cycle of the region. There is a single bit for each strand that is 1 if it is enabled and 0 if it is disabled. This is initially this is set to all 1s to enable all strands. In this example the status for just five strands is shown. The Strand Execution Mask (SEM) state is distributed to all of the functional units within the architecture that are responsible for executing operations.

An individual operation may be a squash that influences the execution of another strand This illustrated by a squash 604 of strand 1 and another squash 607 of both strands 3 and 4. A number of dock cycles after the squash is issued (and its associated condition is true) the appropriate strands are squashed. This prevents operations from those strands being executed. On the diagram they are show as being shaded 603.

There is an ordering to the entry of committed phase for each of the strands shown as the timeline 605.

Instruction Execution

The status of strands is used to influence the execution of individual operations performed by the architecture. Each operation that is performed belongs to a particular strand. The operations must be scheduled statically without knowledge of which particular strands will be enabled or not at run time. Thus the hardware must read the state of strands dynamically to influence the operation execution. If a strand is disabled then any impact the operation has on the permanent state of the architecture must be avoided. This is logically equivalent to the operation not being executed at all. However, this allows a fixed schedule of operations to be used that are able to dynamically respond to the impact of squashed strands without any need to perform branches.

Figure 7:
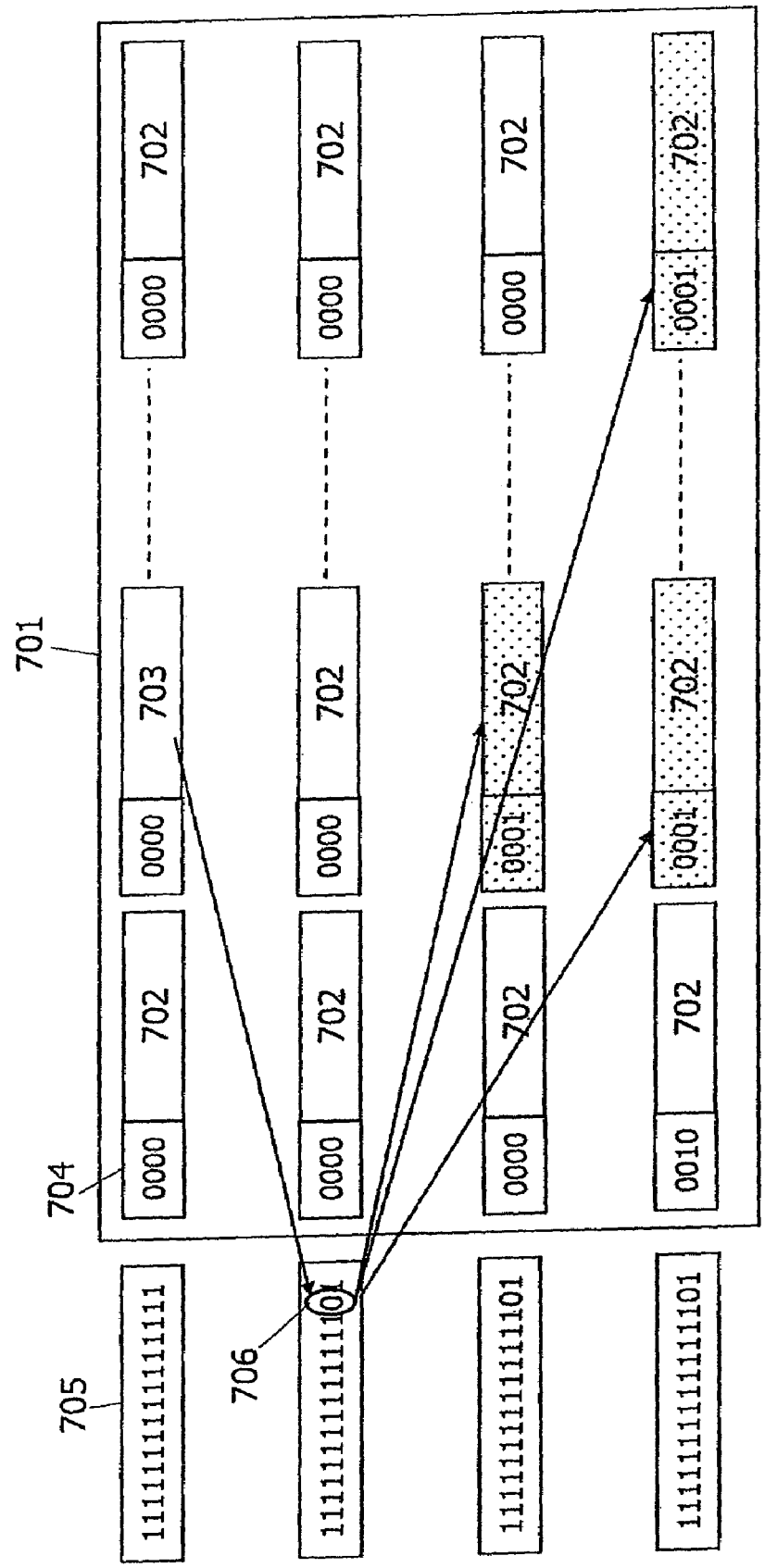
FIG. 7 indicates how a squash operation affects the strand execution status which subsequently disables the execution of later operations.

FIG. 7 illustrates the hardware mechanism that is used to show the relationship between individual operations and their strand membership. The box 701 shows a representation of a region and the execution words within it. A new execution word is executed on each dock cycle. Each execution word is composed of a number of individual operations. Such operations may be composed of a number of operation bits 702 and a strand tag 704. This strand tag gives the number of the strand to which the operation belongs. In this example there are a maximum of 16 strands and thus a 4 bit strand number. The operation bits control various other aspects of the operation execution.

Every operation that is issued uses its strand tag to compare against the SEM state, which is distributed globally to all functional units. If the relevant strand is disabled then the execution of the operation will not have any permanent impact on the state of the architecture. Thus operations that perform memory or register writes must be suppressed in this manner. Certain other types of operation never perform operations that affect register or memory does not need to be suppressed and can be executed whether the strand they belong to is enabled or not. Such operations do not need a strand tag and thus the execution word width can be reduced.

The SEM state is shown as 705 for each cycle of execution. An example squash 703 is shown being issued in the first dock cycle that squashes strand 0001. This dears the bit in the SEM 706 so that subsequent operations issued to strand 1 are disabled. These disabled operations are shown as being shaded in the figure.

Code Generation

This section describes the subdivision of the sequential code to be run on the architecture into individual regions. Each region is itself composed of one or more strands. The efficient creation of regions and strands from the application code is key to obtaining good performance from the architecture.

Calling Subroutines

Figure 10:
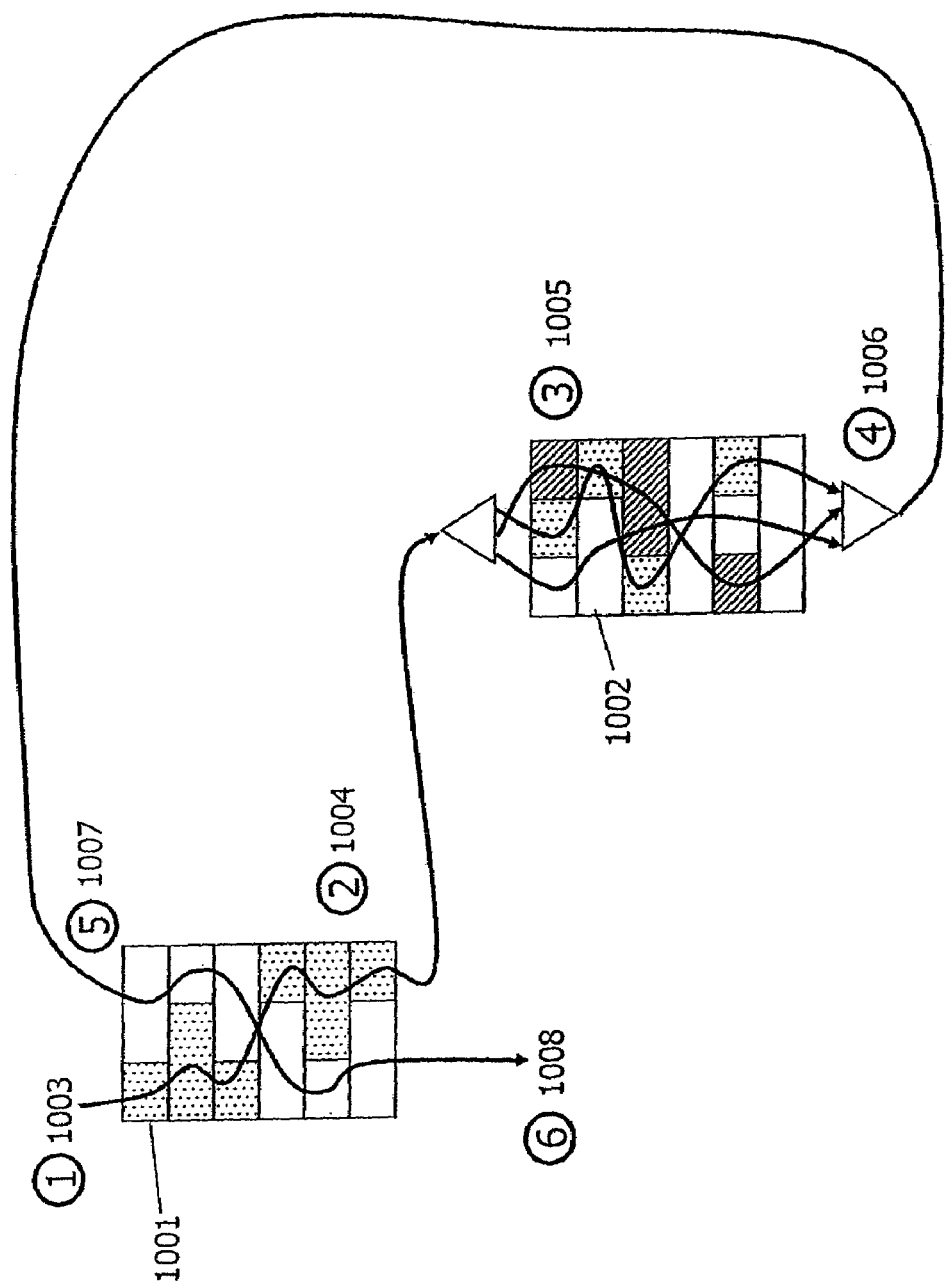
FIG. 10 illustrates how the strand mechanism used to effect a call and return from a subroutine where the call is not performed from the final strand in a region.

The subroutine calling mechanism used in the presence of strands is illustrated in FIG. 10. This performs a call from a region 1001 to a called region 1002. The flow of control is shown as 1003. A call is implemented as a standard branch on the architecture. Before executing the branch the host link register is loaded with the return address. This is the address of the instruction following the call. This is normally performed by the program counter being copied to the link register as a side effect of a call. A branch representing the cal 1004 is executed and causes control to be passed to the called region 1002.

The called region is executed 1005. All strands are enabled. The link register may be preserved on the stack frame if further calls are to be made. When the end of the called function is reached (which may or may not be in the region initially called a return instruction is encountered 1006. This is effectively an indirect branch using the link register as a destination. The location loaded is the address of the instruction following the call. This is a reference to the calling region 1001 with a strand number higher than the strand containing the original branch call.

The mapping contains both a region address and a first strand number. The generally occurs to the same region that originally initiated the call. However, the strand number is set to one more than the strand that caused the call. Thus the calling strand and any earlier strands are squashed. In some cases where performance is highly critical the return may be made to a different strand that does not contain earlier squashed strands. A branch is made back to the calling region 1007. Finally execution can continue out of that region 1008.

Read Speculation

This section describes the mechanisms used in the preferred embodiment to perform read speculations. These allow a particular strand to execute with speculative data. If it is later determined that the data used was incorrect then a combination of software and hardware mechanisms allow the correct results to be recovered. This static speculation mechanism utilises the properties of strands to affect this behaviour with a minimum of hardware overhead. The ability to perform speculative operations is key to obtaining high performance through parallelism.

Memory Dependencies

One of the most difficult aspects of the architecture is maintaining memory dependencies. These must be preserved between memory accesses that might potentially access the same memory location (i.e. they may be aliased). If the compiler is able to prove that two memory accesses cannot be to the same location then they may be arbitrarily reordered without affecting the results generated from the program.

The code generator must observe dependencies between memory accesses that may be to the same location.

The dependencies that must be observed are as follows:

Write-After-Read (WAR): Writes must not be scheduled earlier than a preceding read that may be aliased Write-After-Write (WAW): The order of potentially aliased writes must be maintained.

Read-After-Write (RAW): Reads must not be scheduled earlier than a preceding write that may be aliased Write operations may only occur in the committed phase of a strand. Maintaining these rules significantly restricts the amount of parallelism available to the architecture.

Software analysis is unable to derive much information for a large proportion of memory accesses. These would have a major detrimental effect on the potential parallelism in the architecture. The strand mechanism is used to allow these to be executed out-of-order in many circumstances.

Dependencies between memory operations within a strand are always preserved. That is, the order of such instructions is not changed. The scheduler also maintains WAR and WAW dependencies for memory operations between strands.

The majority of performance benefit can be obtained by allowing RAW dependencies to be reordered. This allows a read to be scheduled earlier than a potentially aliased write. Most chains of calculations start with a read operation, and this allows the calculations to be started earlier and be potentially executed in parallel with other code. If the read and write are not aliased then the correct result is produced. If, however, they are aliased then the read should have obtained the data stored by the write. The whole chain of calculations will produce an incorrect answer.

Whenever a potentially dependent read is moved before a write a checking operation is also present. This compares the addresses of the read and the write. If they are identical (i.e. there is a hazard) then the strand containing the read is aborted. The earlier strand containing the write is allowed to complete and then the whole region is repeated. The read is then able to pick up the value written by the earlier strand and the correct result is produced. This whole process requires the minimum of hardware overhead. No additional compensation code is required to recover from a hazard situation. The underlying microarchitecture and execution model handle it automatically.

Check Hazard Instructions

Check hazard (chaz) operations are used to validate the boosting of loads over stores. They must be present whenever a read has been boosted over a previous write. It checks for an address conflict and aborts the reading strand if so. All chaz instructions must be issued in the speculative phase of the reading strand while all writes must be issued in the writing strand's committed phase.

A particular processor may support a number of individual chaz units. A chaz unit simply compares two addresses and generates an abort if they match. This is used to compare the load and store addresses and abort the load strand if there is an address match.

A chaz operation has two operands, a left operand that is the store address and the right operand that is the load address. The execution strand number is obtained from the left operand. If the store strand is not being executed then the operation is disabled.

The number of the strand to be aborted is obtained from the strand associated with the right hand operand (the load address).

Read Speculation Example

Figure 12:
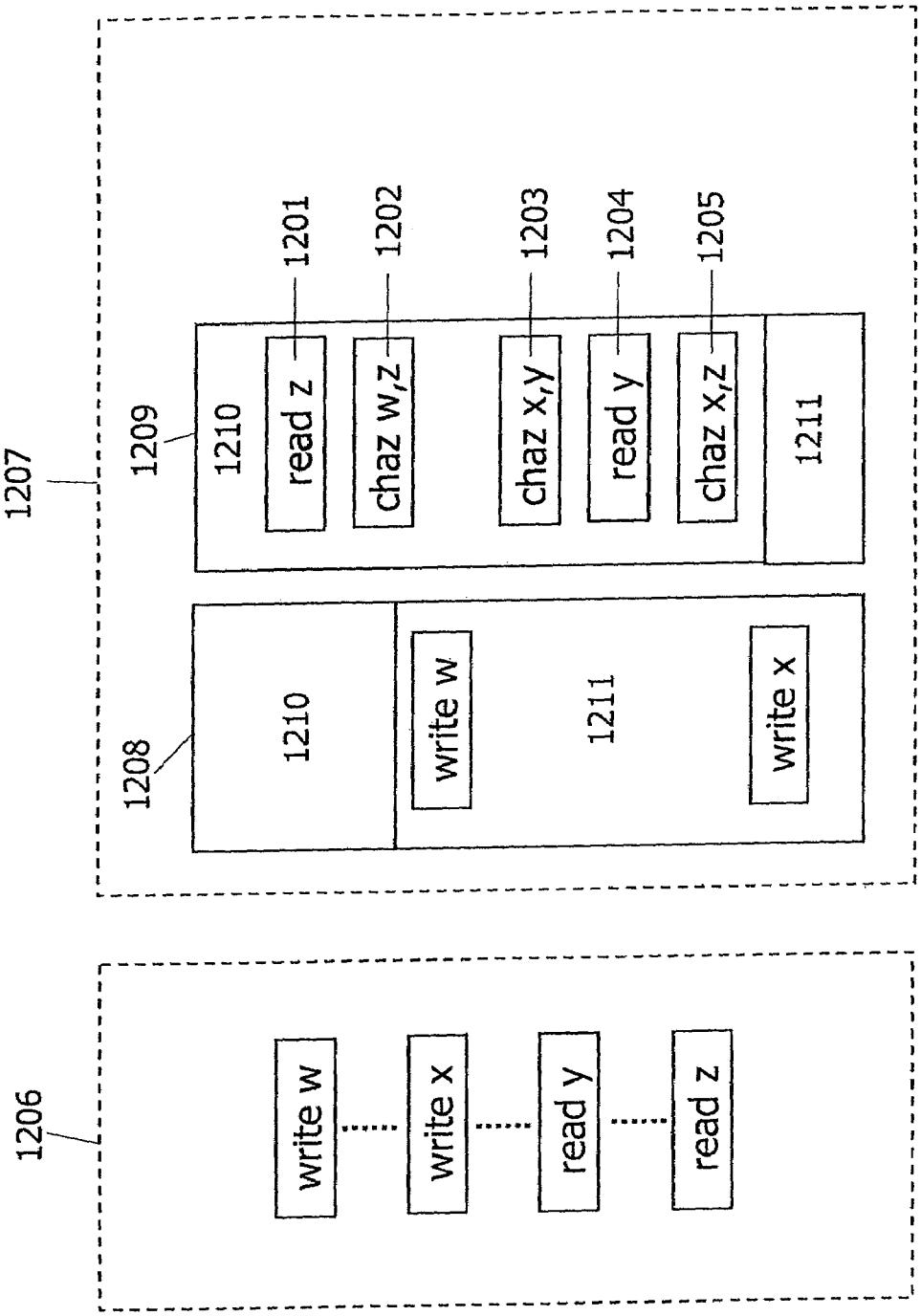
FIG. 12 illustrates how a sequence of memory accesses might be mapped into two different strands with appropriate alias checking operations.

FIG. 12 shows an example of read speculation being performed. The original code is shown 1206. Two write operations are followed by two read operations. Any of the four addresses may in fact be aliases to the same memory address. Software analysis before execution is not able to determine if those locations could be alised or not.

The scheduled code is shown 1207. The operations are split into two distinct strands 1208 and 1209. Each of the strands consists of a speculative phase 1210 and a committed phase 1211. If read speculation is being performed then it must be done on an inter-strand basis. Speculation between accesses within a strand is not possible as there is no way for the hardware to perform the required selection re-execution of code. The two write operations are placed in the temporally first strand 1208. This is because the writes are before the reads in the original code. The reads are placed in strand 1209. However, the placement into different strands gives the code scheduler the freedom to move the reads earlier than potentially aliased writes. The read z 1201 is moved earlier than both writes and the read y 1204 is moved earlier than the write x. This boosting allows improved scheduling freedom and thus greater parallelism and performance.

If any of the locations are indeed aliased then this code sequence will produce incorrect results. Thus chaz operations must be inserted to detect hazards and initiate the recovery from them. A chaz is required for each write that a read is moved across to which it may be potentially aliased. The read z has two chazs 1202 and 1205 for comparing against both the w and x values. The read y has a single chaz 1203 for comparing against the x value.

Figure 13:
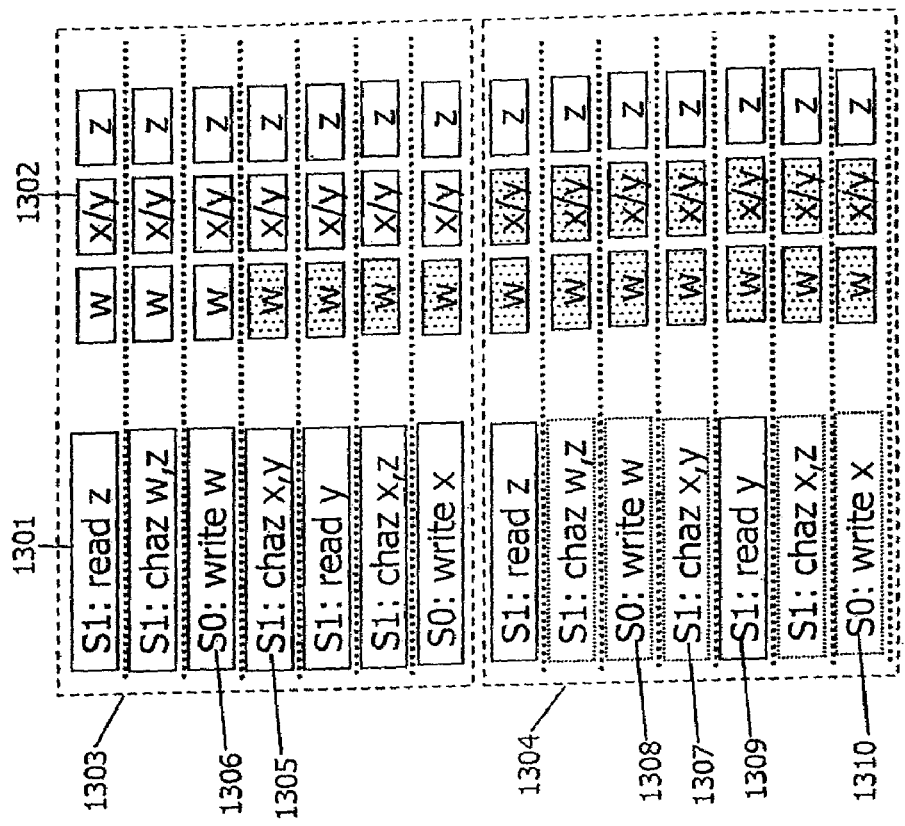
FIG. 13 provides an example timeline of how the operations given in FIG. 12 might be executed in the context of a load and store being aliased.

FIG. 13 below shows an example execution of the same code. The instruction stream 1301 shows the operations being performed and the memory content 1302 shows the value of memory locations at that point of execution. The operations are aged with the strand that they belong to. The memory content is shaded as the value in memory is updated by a write operation.

In this case the memory locations x and y are aliased (i.e. actually point to the same memory location). The write w operation 1306 is performed as it is from the enabled lower strand. When the chaz operation comparing the x and y values 1305 is executed a hazard is detected that disables the upper strand. Since the chaz is in strand 1 all operations in strands 1 or higher are disabled from that point of execution. Since all chazs for a strand must occur before any writes (since chazs are in the speculative phase and writes can only be performed in the committed phase) the strand will not have changed the memory contents. Despite the hazard execution continues until the end of the region execution 1303. The values of locations w and x/y are, updated by the writes in strand 0.

When the end of the region is reached the previous hazard causes the region to be re-executed 1304. If no hazard was detected because there was no aliasing then all strands would have been successfully completed during the initial execution. On the re-execution, due to the RAW hazard, strand 0 is disabled since it was previously completed. Thus the writes 1308 and 1310 are not illegitimately repeated a second time. The x and y locations will still be aliased on the second execution. However, the chaz comparison 1307 will not be performed since the x value is computed in strand 0. Since that strand is not executed the chaz will detect the strand tag from the x value and disable the chaz. Thus the chaz will not cause a hazard on the second execution. The read y operation is performed and reads the value written by the write x operation on the first execution of the region. Thus even though the write x operation occurs after the read y operation in the region schedule, the re-execution allows the later write to pass data to the earlier read if necessary.

Strand Abort Mechanism

Figure 14:
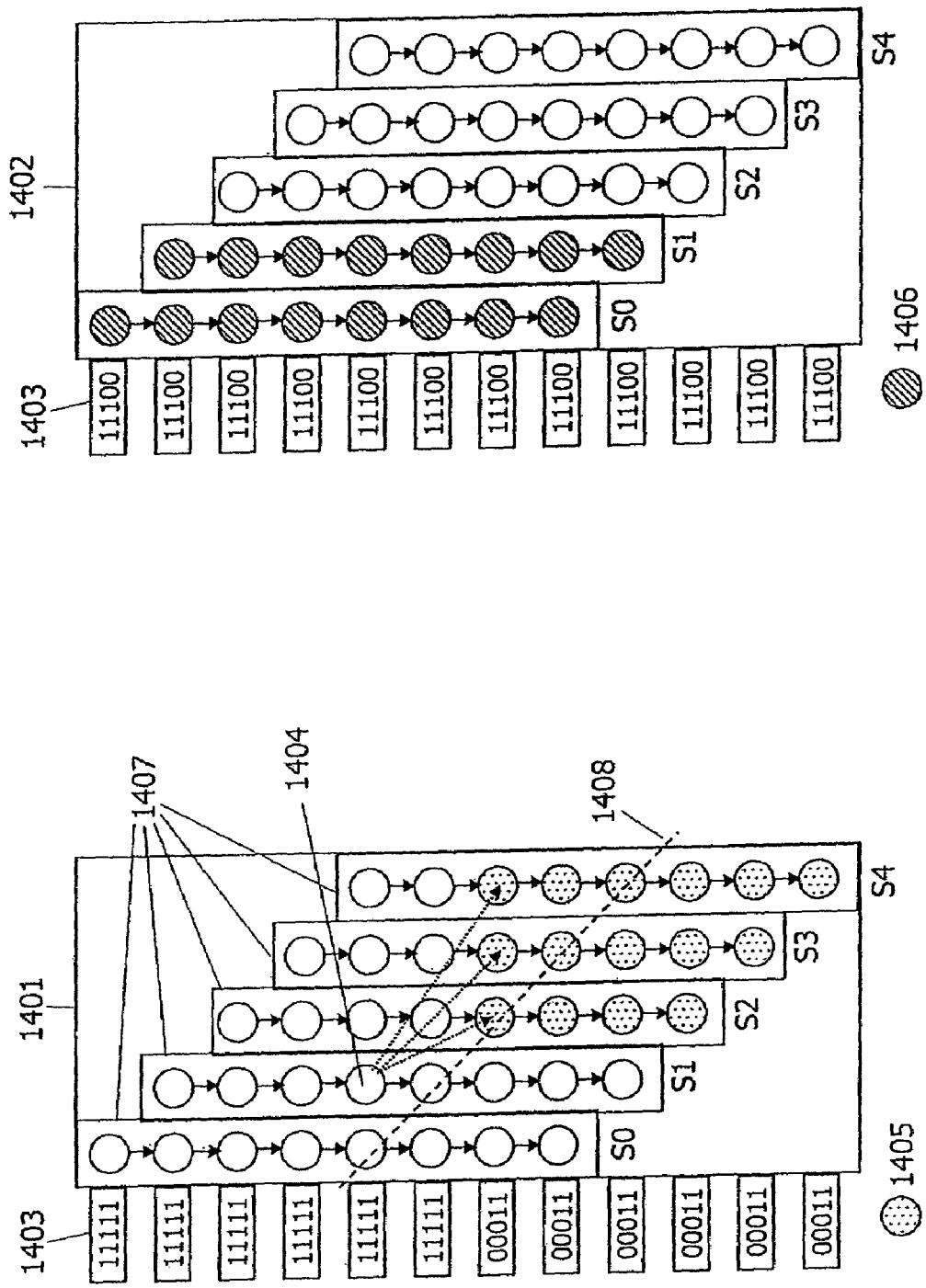
FIG. 14 provides an illustration of how a number of strands may be aborted and then re-executed in order to avoid the data hazard.

FIG. 14 illustrates the strand abort mechanism that is used to allow recovery from hazards detected by check hazard operations. The figure shows a region and the execution during the abort and then during the subsequent restart required to recover from the abort. If such a hazard occurs then a strand is performing a speculation that is invalid The strand must be aborted before it enters its committed phase and must be subsequently re-executed with the cause of the hazard removed.

The initial execution of the region is illustrated in 1401. It is composed of a number of strands 1407. A particular chaz operation 1404 compares two addresses and generates an abort if they match. This is illustrated on the diagram with certain operations becoming aborted 1405. All of the aborts must occur before the commit point of the strands 1408. The SEM state is shown on a cycle by cycle basis 1403. The abort has an immediate impact on the SEM state by disabling strands 2 and above. The presence of aborts causes the region to be restarted once the current execution of the region has completed.

The area 1402 shows the restart execution of the region. The strands 0 and 1 will have completed their execution and entered their commit phase as part of the initial region execution. Thus when the region is restarted those strands should not be executed again. They are marked as squashed 1406. However, the strands which were aborted can be rerun. This is illustrated by the initial SEM state that is shown for the restart. The region is executed again but with the first two strands disabled. If the region completes without any further aborts then the next region can be executed, otherwise further restarts may occur.

The initially generated abort will have been caused by a hazard between the aborted strand and a write on an earlier strand. Since that earlier strand will not be executed as part of the restart the same abort will not occur again. Moreover the read on the restart will obtain the data that was written by the lower numbered strand, even though that write is from an operation that is later in the schedule.

Thus this mechanism provides means from recovering from hazards without any requirement for alternative code for specially handling hazards. The strand and abort detection mechanism is used to re-execute the region the required number of times so that there are no hazards and the correct results are ultimately obtained.

Stand Guard Mechanism

Figure 15:
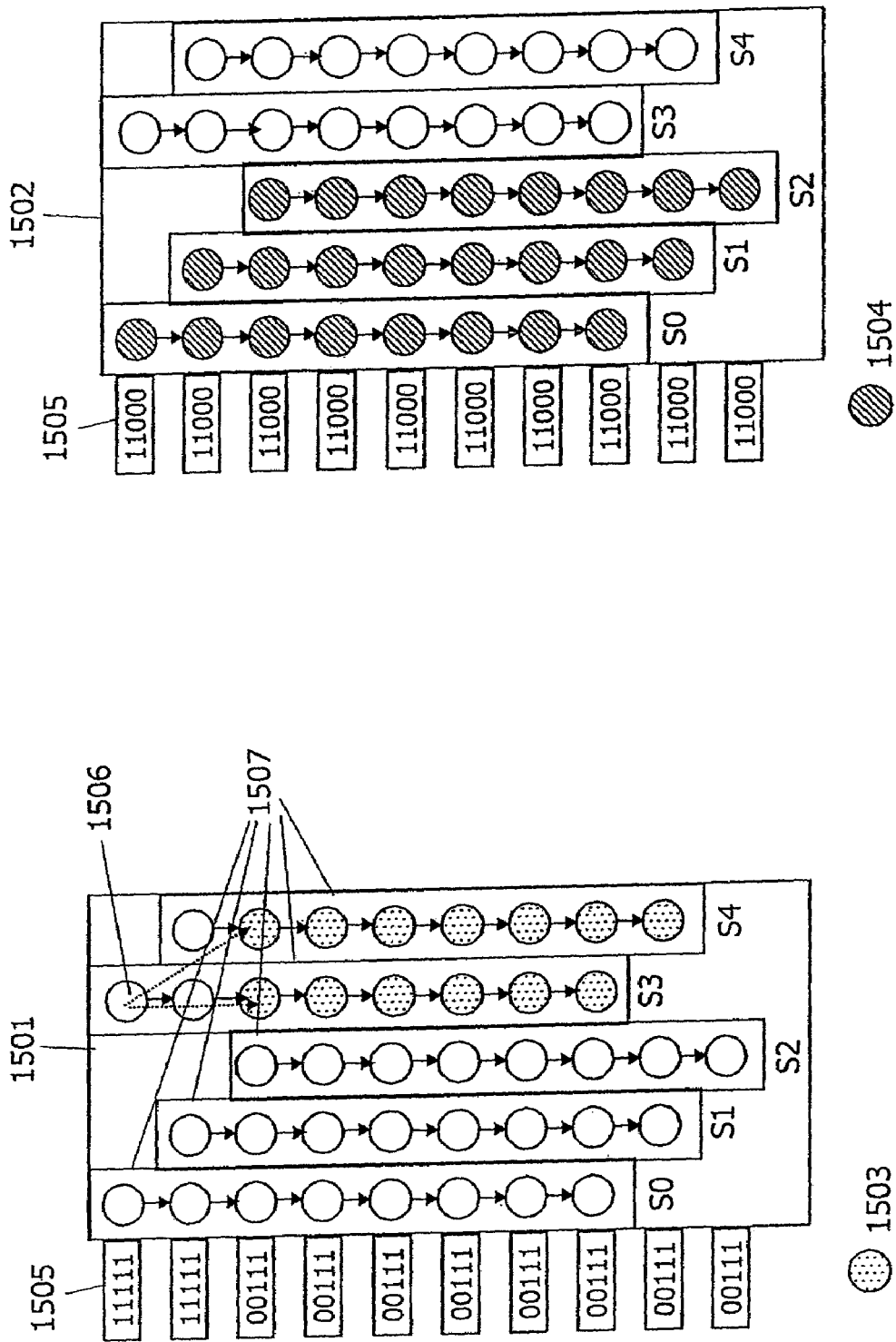
FIG. 15 illustrates how a static guard operation may be used to abort a series of strands and force a subsequent re-execution.

The guard mechanism also uses the concept of a strand abort, but for the purpose of improving code density rather than recovering from bad speculations. FIG. 15 illustrates the use of the strand guard mechanism. Area 1501 shows the first execution of a region. The region contains a number of strands 1507. Strands 3 and 4 have been scheduled without reference to dependencies on the earlier strands. This allows more unconstrained motion of operations from those strands and allows them to be issued in earlier slots in the schedule, reducing the overall schedule length and improving the utilisation of the execution word. Thus the code density is improved. However, strands 3 and 4 cannot be executed in the same region execution as the lower strands as data generated by them may not be read later in the schedule by strands 4 and 5. A guard operation 1506 associated with strand 3 ensures that the higher strands are aborted if the earlier strands are being executed. The SEM state is shown on a cycle by cycle basis as 1505. The lower strands are being executed so strands 3 and 4 are aborted 1503 as shown and influence the SEM so that their operations do not update the machine state.

Since an abort occurs the region is re-executed, as shown as 1502. In this case the strands that were completed (strand 0-2) are now disabled as they should not be executed again. Since strand 3 is the first strand being executed the guard unit no longer generates an abort and allows their execution to continue normally.

Strand Management Hardware

This section describes the detail of the hardware mechanisms used to implement strands.

Functional Unit Data Plane

Figure 16:
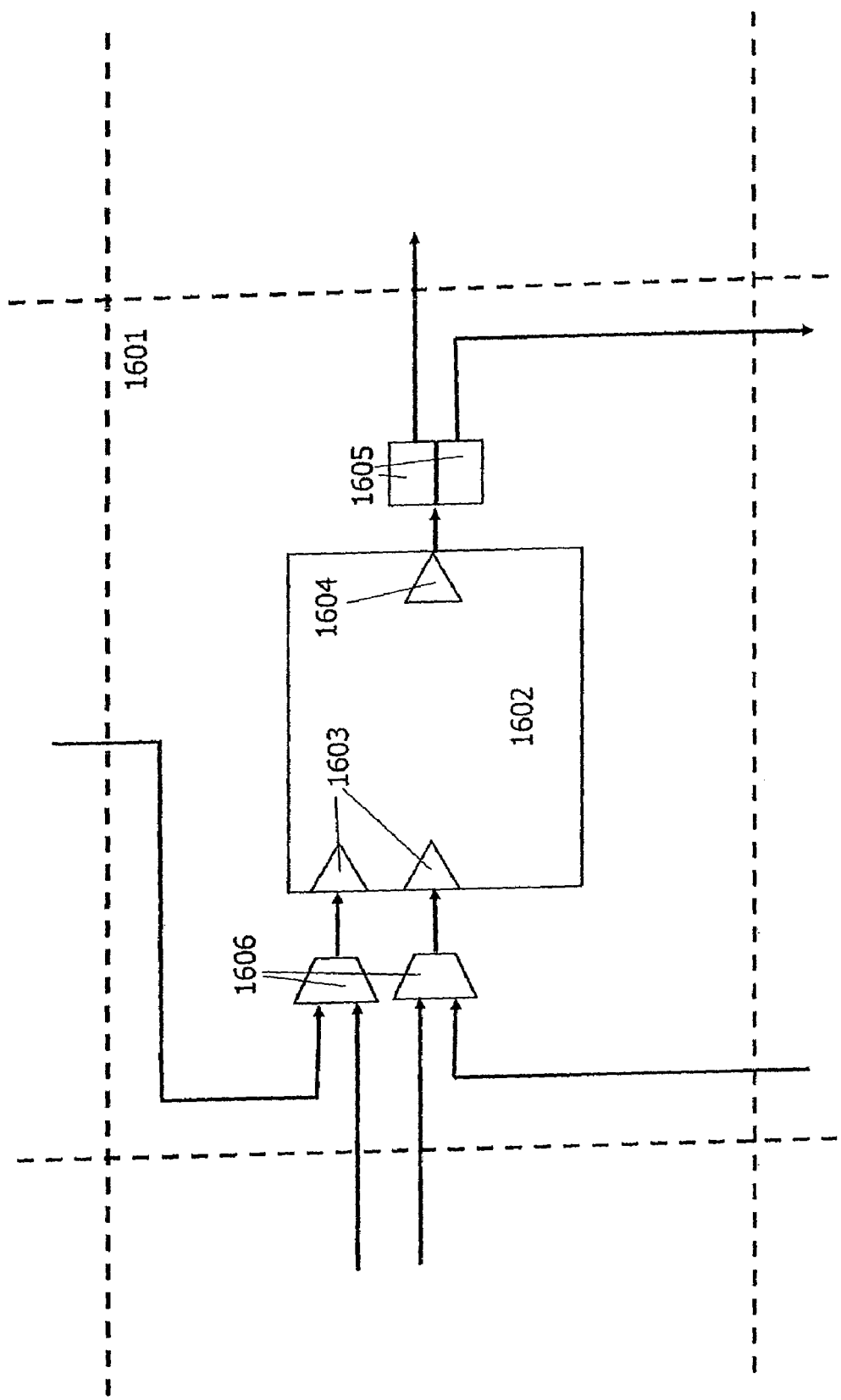
FIG. 16 provides an overview of the data plane connections to a functional unit including input and output mechanisms and potential neighbour connections.

The internal architecture of functional unit is shown in FIG. 16. This diagram concentrates on the data plane of the functional unit. That is, it shows the buses used to pass application data form one unit to another. A separate control plane is used to influence how that data flows and the operations that are performed upon it.

The central core of a functional unit is the execution unit 1602. It performs the particular operation for the unit. New functional units may be created using user defined execution units. The blocks 1605 and 1606 are instantiated in order to form a functional unit 1601. These blocks allow the functional unit to connect to other units and to allow the unit to be controlled from the execution word.

Each operand input 1606 to the execution unit may be chosen from one of a number of potential data buses using a multiplexer. In some circumstances the operand may be fixed to a certain bus, removing the requirement for a multiplexer. The multiplexer selections are derived from the execution word. The number of selectable sources and the choice of particular source buses are under the control of the architectural optimisation tools. The data is presented to the execution unit on the operand input buses 1603.

All results from an execution unit 1604 are held in independent output registers 1605. These drive data on buses connected to other functional units. The output register holds the same data until a new operation is performed on the functional unit that explicitly overwrites the register.

Functional Unit Control Plane

Figure 17:
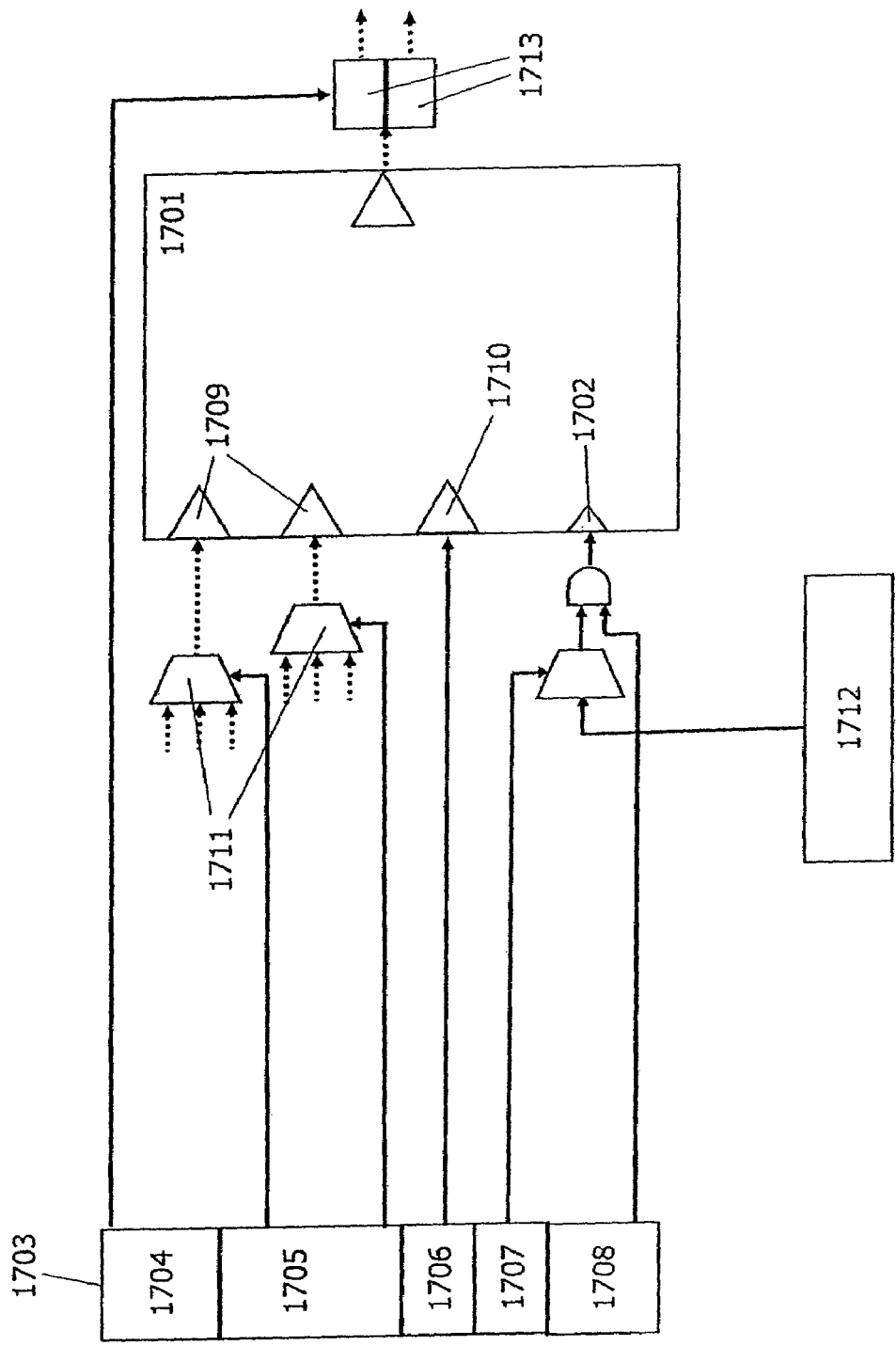
FIG. 17 illustrates how bits within the execution word are used to control various aspects of a functional unit on a cycle-by-cycle basis.

FIG. 17 shows greater detail of the control plane for a functional unit. The area 1703 shows the bits within the execution word that are used to control the functional unit. This is composed of a number of different sections for describing different aspects of the operation to be performed by the functional unit. This field is formed from a subset of bits from an overall execution word used to control all of the functional units within the architecture.

The sub-field 1704 controls which of the output registers should be updated with a result. The sub-field 1705 is used to control the operand multiplexers 1711 to select the correct source of data for an operation. This data is fed to the execution unit via the operand inputs 1709; The sub-field 1706 provides the method that should be performed by the execution unit and is fed to the unit via the input 1710.

The optional sub-field 1707 provides the number of the strand to which the operation belongs. This is used to select the corresponding status bit from the Strand Enable Mask (SEM) 1712 via the multiplexer. This is a global state accessible to all functional units that dynamically indicates which strands are currently active. This is used to condition the functional unit select so that if a particular strand is disabled (its SEM bit is 0) then the functional unit operation is not performed. This is the means by which the strand status is used to influence the conditionality of particular operations. Certain functional units may be executed unconditionally, independently of the strand status. Such units do not required such a strand field.

The opcode bits 1708 are used to select the particular functional unit. If the opcode does not have the required value then all of the other bits are considered to be undefined and the functional unit performs no operation.

Squash Unit

Figure 18:
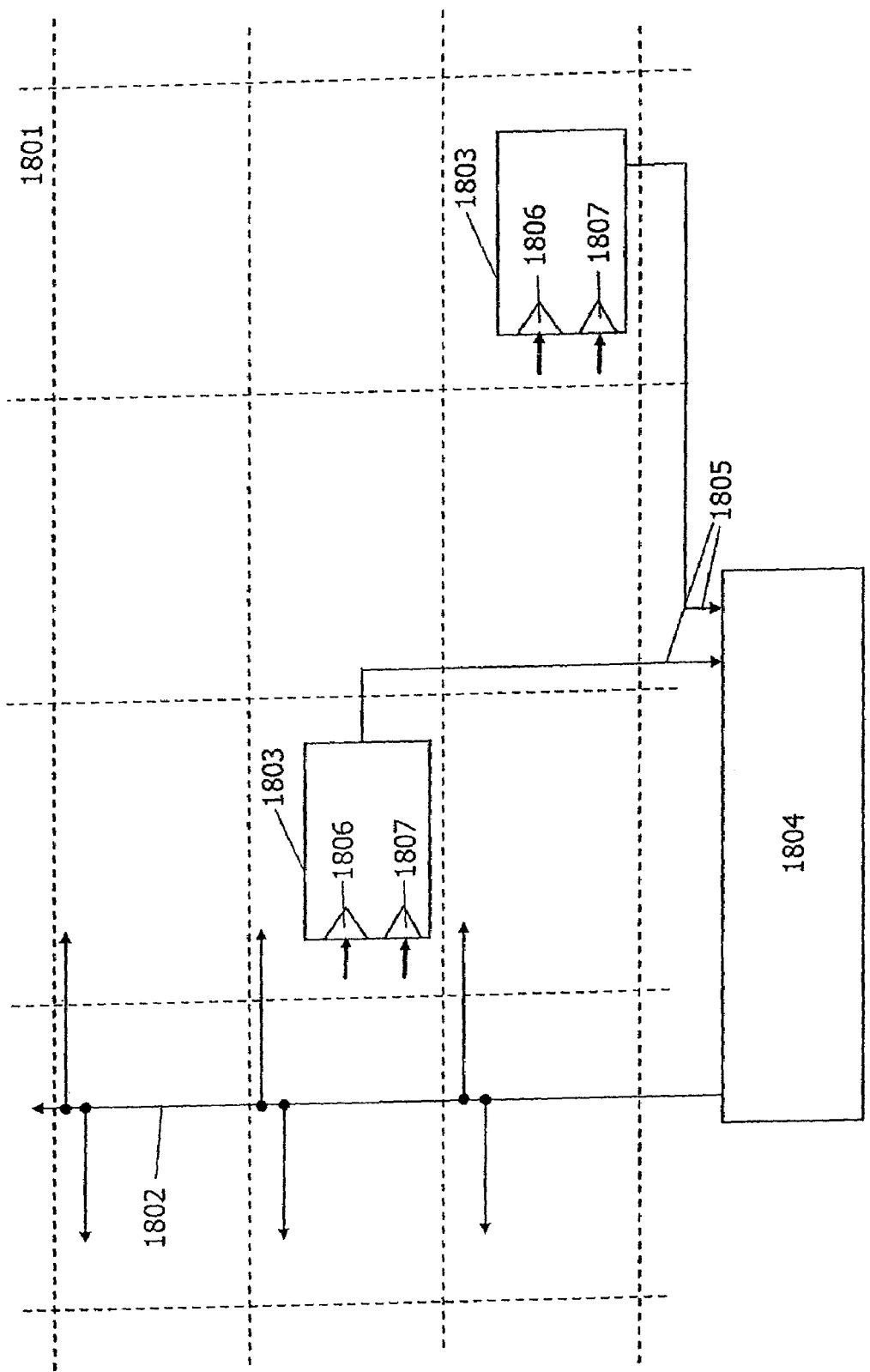
FIG. 18 illustrates the distribution mechanism for the strand status that is bussed to various functional units in the system.

This section describes the squash unit. This is a special type of functional unit that allows the strand state to be modified by the values in the data plane of the architecture. FIG. 18 shows examples of squash units in the architecture 1801. The example shows two different squash units 1803 in the functional unit array. Any number of squash units may be supported in order to support the level of operation parallelism that is required in the architecture. Each squash unit has a status input 1806 and a method input 1807. The status is generated as a result of some previous data operation, such as a comparison, that is to be used to influence the conditionality of subsequent code. The method shows the type of condition of that is being evaluated from the status. The output 1805 of the squash unit is to the global Strand Control Unit 1804.

The Strand Control Unit 1804 is responsible for combing the squashes emanating from a number of squash units in the architecture. It then updates the strand status accordingly in the form of the Strand Enable Mask (SEM) which is distributed 1802 to various functional units. This is a status bus with a single bit for each strand. This indicates if the strand is currently enabled or not. The SEM is distributed to many functional units within the architecture and is used to affect their operation as described previously. Thus the action of a squash unit can directly impact the execution of various subsequent operations.

Check Hazard Unit

Figure 19:
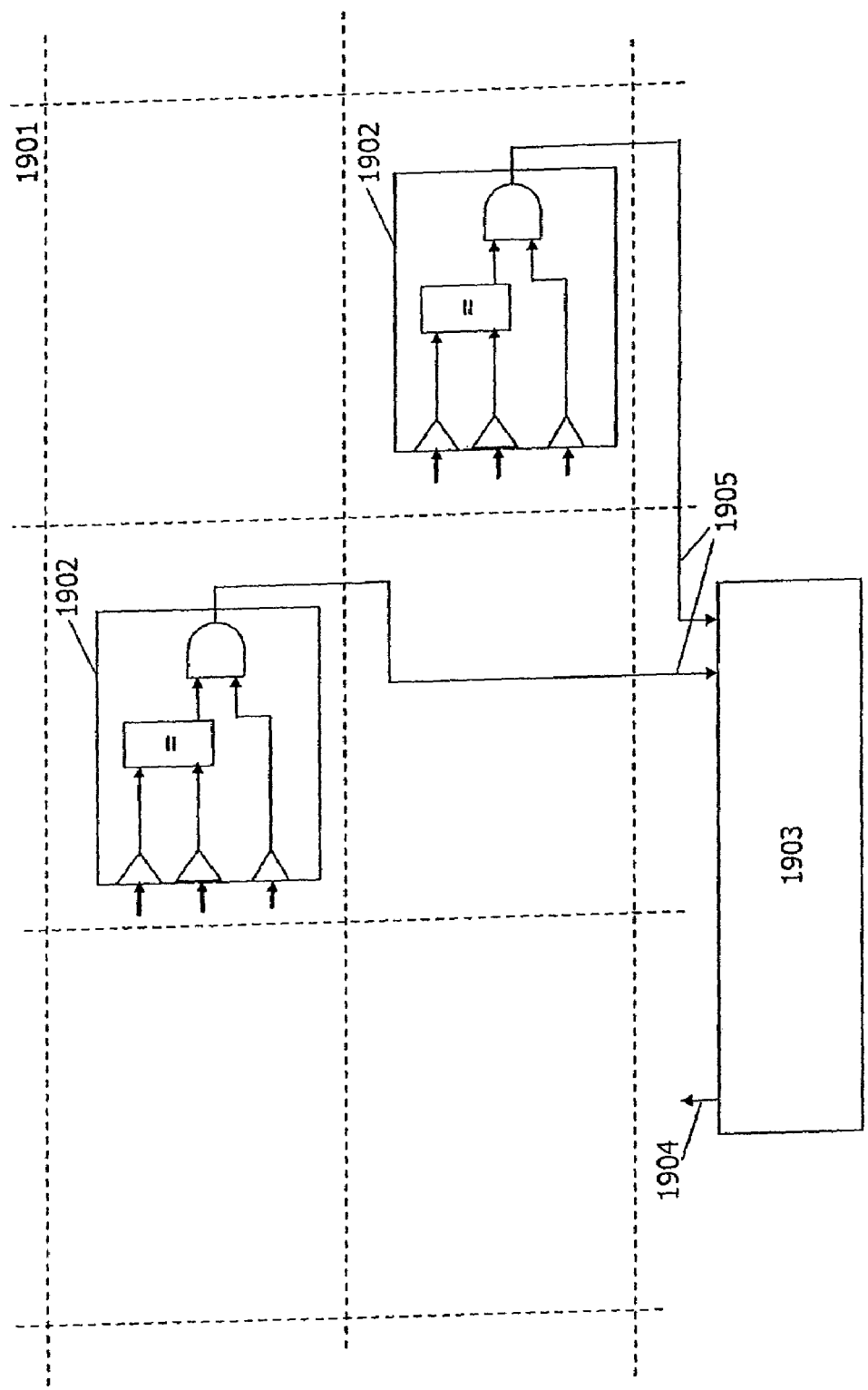
FIG. 19 illustrates the internal architecture of the functional units used for checking aliases between addresses that can cause an abort of a strand.

The Check Hazard Unit is a special unit that, like squash, is used to impact the state of the SEM and thus the execution of various subsequent operations. However, unlike the squash unit, this unit is used to detect transient violations of the required ordering dependencies between operations. FIG. 19 shows a number of Check Hazard Units 1902 present in an example architecture 1901.

The Check Hazard Unit is generates aborts when it is supplied with two addresses that match. These addresses represent memory locations that are being accessed by certain memory operations. If these memory operations are accessing the same locations then a hazard has occurred that influences the execution of subsequent strands. The abort information 1905 from each of the Check Hazard Units is sent to the Strand Control Unit 1903.

The Strand Control Unit 1903 collates all of the incoming abort information and updates the Strand Enable Mask (SEM) accordingly. The aborted strands are marked as disabled in the SEM which is distributed 1904 to the functional unit array. Unlike a squash, however, the abort only occurs transiently until the end of the region execution. After the region has been completed the region will be re-executed and the previously aborted strands will be enabled again.

Guard Unit

The guard unit is a special unit, like the squash unit, that is used to impact the state of which strands are enabled. Guard units are used to disable strands that are being executed out of order with respect to other strands. Such out-of-order execution is used to pack a greater number of operations within a region and thus achieve a greater code density. Use of guards allows trade offs to be made between code performance and code density.

Figure 20:
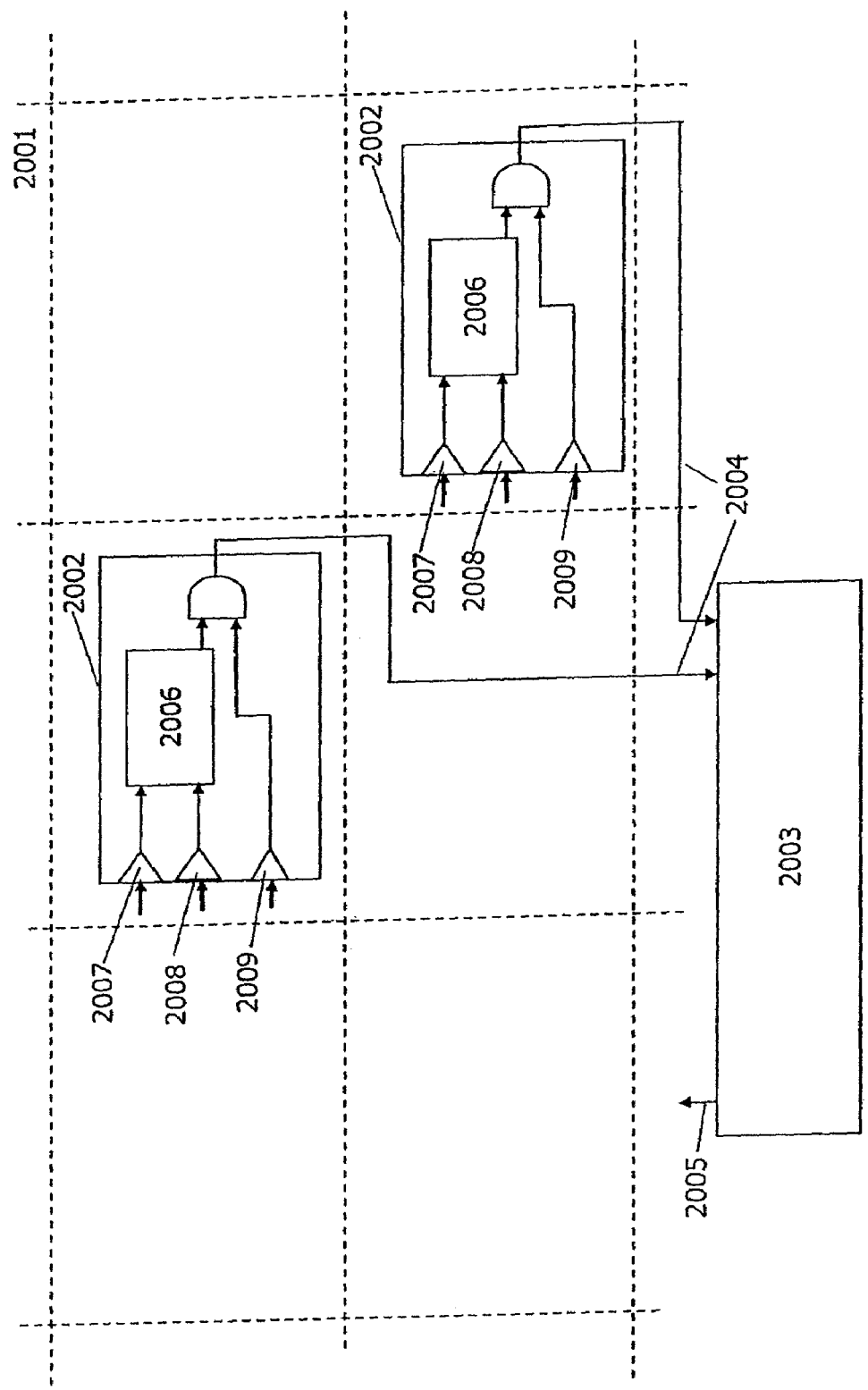
FIG. 20 illustrates the internal architecture of the functional units used to guard execution of certain groups of strands.

FIG. 20 shows two different guard units 2002 present in the functional unit array 2001. Each guard unit examines the strand number in which it is being issued 2008 and the status of all the strands 2007. The unit determines if that is the lowest strand that is being executed using the comparator 2006. If so and the enable 2009 is set then it is valid for the strands that are being guarded to be executed as there are no lower active strands that could influence its execution. If the guard strand is not the lowest being executed then the strand (and all higher strands) must be aborted. This prevents the guarded strand being executed out of order.

The strand control unit 2003 as a number of incoming abort buses 2004 from check hazard and guard units in the system. When an abort is received the aborting strand and all higher strands are aborted. This influences the state of the Strand Enable Mask (SEM) generated from the strand control unit. This is distributed 2005 to functional units in the array. In turn this prevents any operations from those or higher strands being executed.

Strand Control Unit

This controls the execution of strands within a particular region. The unit generates a vector of the current strands that are being executed. Functional units use the vector in order to squash operations from disabled strands. The unit also detects conditions that require the current region to be re-executed to preserve memory dependencies.

Strand Abort Mask (SAM)

The SAM is a bit mask with a single bit for each strand. If a bit is reset then that indicates that the corresponding strand has been aborted. A strand may be aborted due to a check hazard or guard instruction. A strand abort indicates that the there has been a dependency violation and the strand must be re-executed (unless the strand is squashed).

Figure 21:
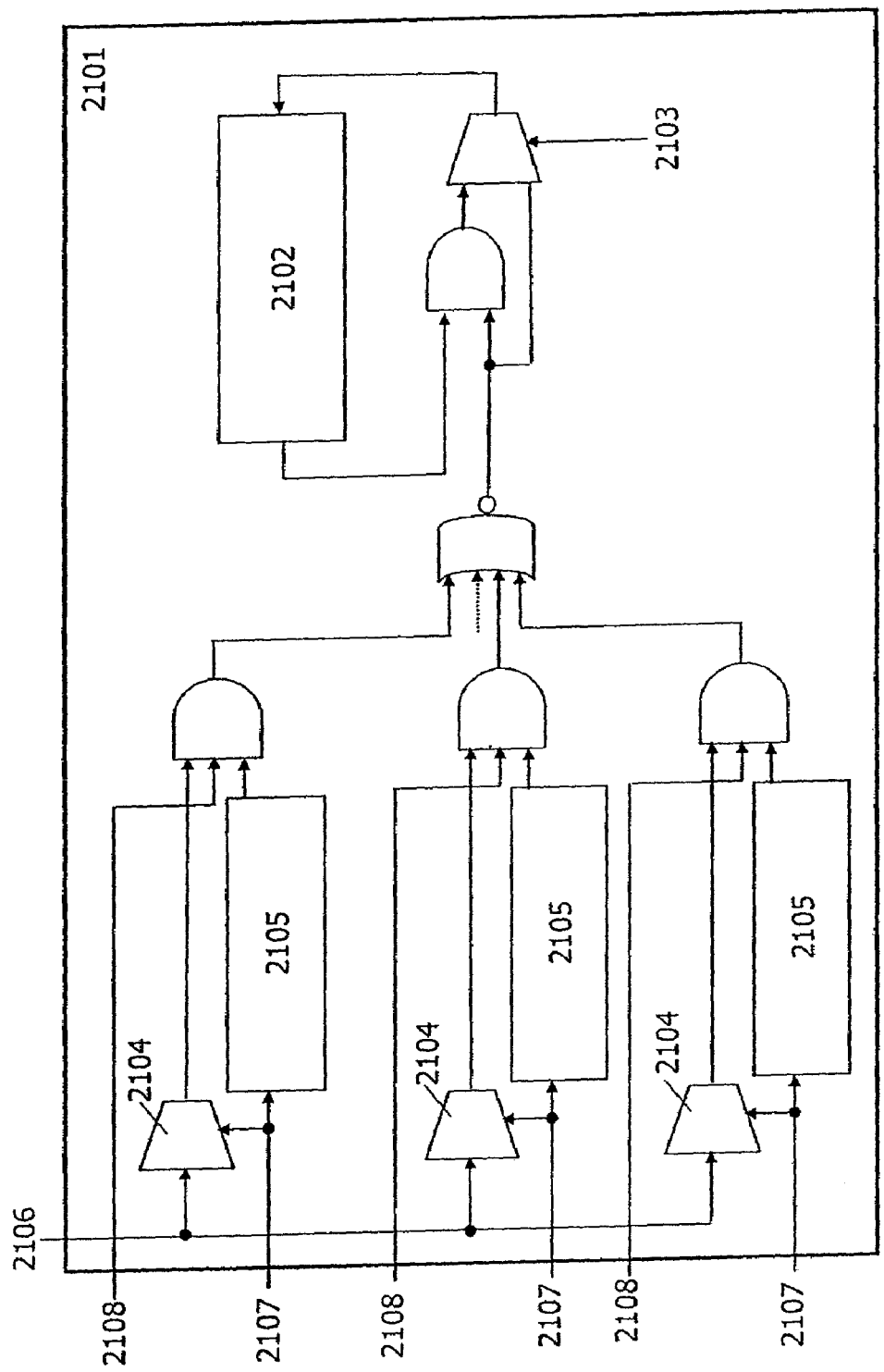
FIG. 21 illustrates the internal architecture of the abort handling module within the overall strand control unit.

A number of individual abort buses are supported to allow the use of multiple units that may generate strand aborts. Such units include check hazard and guard units, as previously described. The logic for updating the SAM in response to these aborts is shown in FIG. 21.

The box 2101 represents the overall abort handling section of the strand control unit. Each abort unit produces a strand number to be aborted 2107. For each abort strand 2107 there is also an enable bit 2108. The appropriate bit from the Strand Predicate Mask (SPM) 2106 is examined using the multiplexer 2104. If the strand is already squashed then no action is taken. If the strand is not squashed then that strand and all higher numbered strands are aborted.

Higher numbered strands have to be aborted since, if a strand produces an incorrect value due to a dependency violation, then higher strands may be polluted with the incorrect value. The units 2105 generate a mask of set bits from the supplied strand number and above. The valid flag from the abort unit gates the strand mask. All the aborts are combined and are used to mask off bits in the SAM.

Note that if a strand is aborted but later squashed then higher numbered strands will have already been aborted. This may cause a region restart that is unnecessary. Thus it is generally better to resolve the squash status for a strand before issuing any aborts for it.

Upon entry to a region the SAM is initially cleared to the state of the strands being aborted on that cycle. Since aborts will not generally occur on the last cycle this resets the SAM 2102 to all set bits. The end of region flag 2103 is supplied to a multiplexer to implement this behaviour.

At the end of region execution the SAM is combined with the SPM to determine if any un-squashed strands were aborted. If so then the region is restarted.

Strand Predicate Mask (SPM)

The SPM is a bit mask with a single bit for each strand. If a bit is reset then that indicates that the corresponding strand has been squashed and it should not be committed. Bits within the SPM are cleared by squash operations. A single squash operation may clear a block of bits within the SPM. Once a bit is reset it may not be set once again for the duration of the region execution.

A squash is able to clear multiple bits in the SPM in order to efficiently support nested conditional constructs. The top level strand must squash all the strands within the conditional construct if the top level conditional is false. This is because squash operations issued in squashed strands are disabled. Squash operations themselves may only be issued in the provisional or committed phase of their home stand, as they cannot be executed speculatively since they have an effect on SPM.

The branch control unit may also generate squashes. Such squashes are the result of branch resolution. If a branch, from a particular strand, is taken then all higher numbered strands are squashed. This prevents their execution as they are not logically reached since an earlier branch is taken.

The bit with the SPM associated with a particular strand should be reset before that strand enters its committed phase. It is illegal to squash a strand when it has already entered its committed phase.

The SPM is updated on each cycle on the basis of squash vectors generated by the squash units in the processor. A number of separate squash units may be supported in order to provide greater parallelism in the processor. Each squash unit provides a vector of strands to squash. These are combined and are then used to clear bits in the SPM. The SPM is read on each cycle in order to form the SEM. The SEM shows which strands are currently enabled and is distributed to all functional units. It used to disable operations issued for disabled strands.

Figure 22:
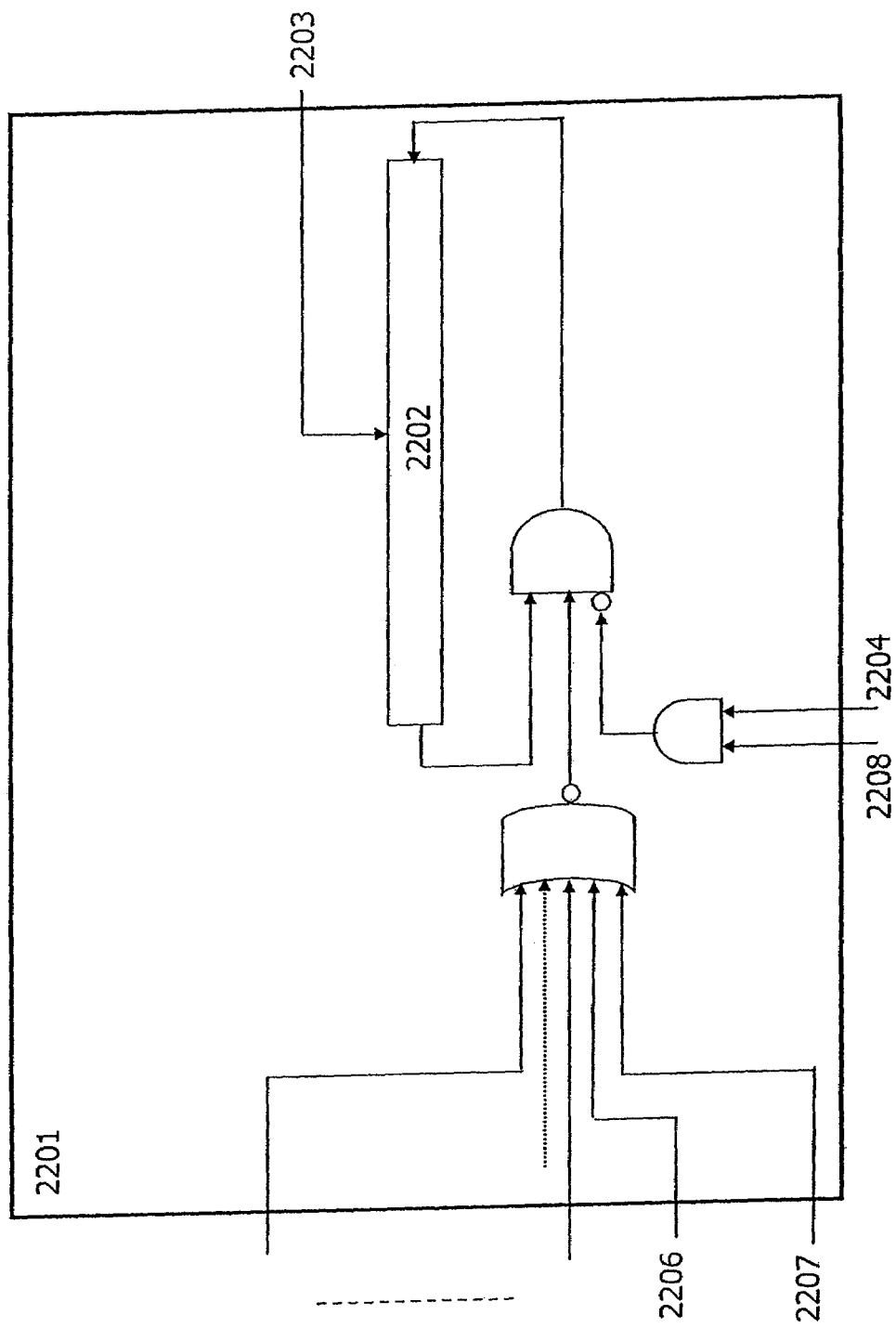
FIG. 22 illustrates the internal architecture of the squash handling module within the overall strand control unit.

The logic for updating the SPM is shown in FIG. 22. The box 2201 represents the squash handling section of the overall strand control unit. A number of squash input vectors 2205 are supplied from the squash units in the functional unit array (not shown). Additional squashes 2206 may be generated by a debug control unit (not shown). Also, additional squashes 2207 may be generated by branch control unit. The squashes are combined to update the SPM 2202. Upon the initial execution of a region the SPM 2202 is initialised with a value 2203 that is representative of the first strand from the region that should be executed. All strands below the entry strand has their SPM bit cleared to squash them. All higher bits are set so that the strand is enabled. Normally the entry strand number is 0 so that all bits in the SPM are set. A nonzero entry strand may is used when entering a region through a side entry. Side entries are used to support returns from calls within a region. This mechanism allows the return to be made to the start of the calling region. The calling strand and all earlier strands are disabled so that they are not re-executed.

The end of region flag 2208 and SAM 2204 are combined so that at the end of execution of the region the SPM is updated appropriately. Thus if no strands where aborted then the SPM is cleared. However, any strands that were aborted maintain an unchanged SPM state. Thus if there are any un-squashed but aborted strands then they will have the corresponding bit set in the SPM. If the SPM is nonzero then the region is restarted in order to execute those strands.

Strand Enable Mask (SEM) Calculation

The Strand Enable Mask (SEM) is calculated on each clock cycle and distributed to all functional units. It is used to mask all operations issued to strands that are disabled. This prevents disabled strands generating permanent side effects from their committed phase.

The SEM is calculated from a number of individual components:

SPM: Any strand that has been squashed is disabled. Once a strand has been squashed then no further operations are executed from it. There is a delay of a few dock cycles between issuing a squash operation and the effect being represented in the SEM value distributed to all functional units.

The squash must therefore be calculated some dock cycles ahead of the affected strand entering its committed phase.

SAM: Any strand that is marked as being aborted is disabled. The SAM is temporary and is reset if the region is re-executed.

Figure 23:
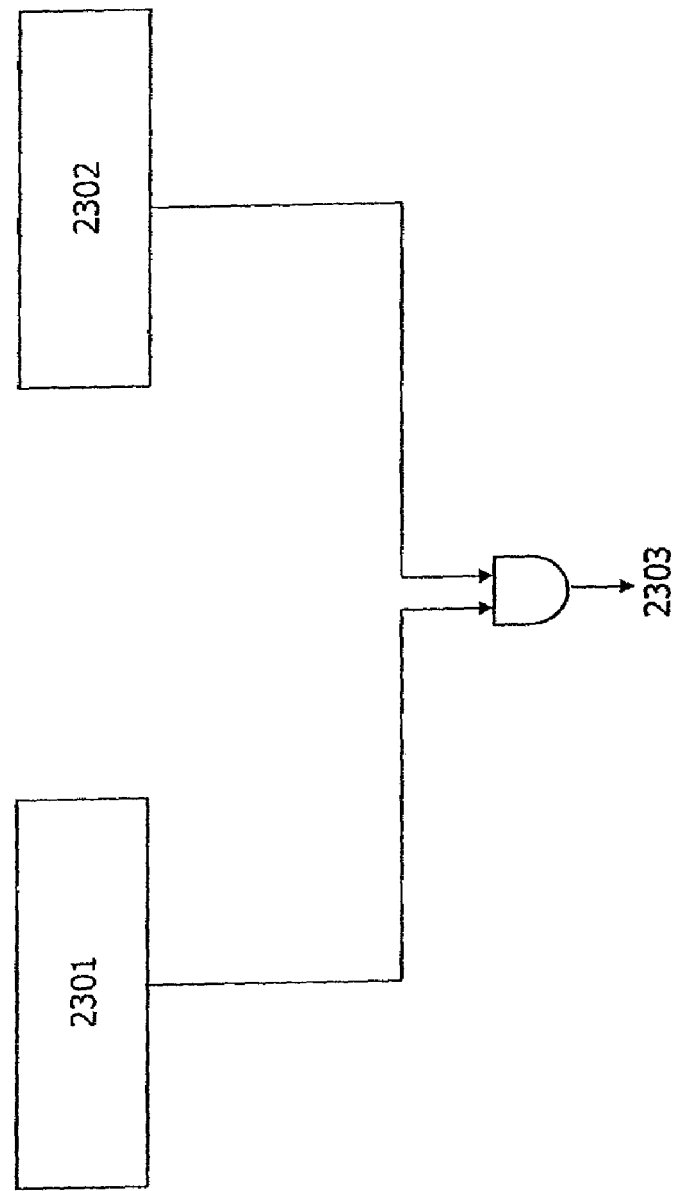
FIG. 23 illustrates how the abort and squash strand states are combined in order to generate a strand status that may be distributed throughout the processor architect.

The calculation of the SEM is detailed in FIG. 23. The SAM 2301 and SPM 2302 are combined on a cycle-by-cycle basis to produce the SEM 2303.

Division into Regions

A region is formed from a contiguous sequence of original sequential instructions. The number of instructions that are included within a region is dependent upon many factors, especially the control flow topology of the included instructions. A region is not terminated by branches or calls and thus encompasses a much greater extent than a basic block.

Figure 8:
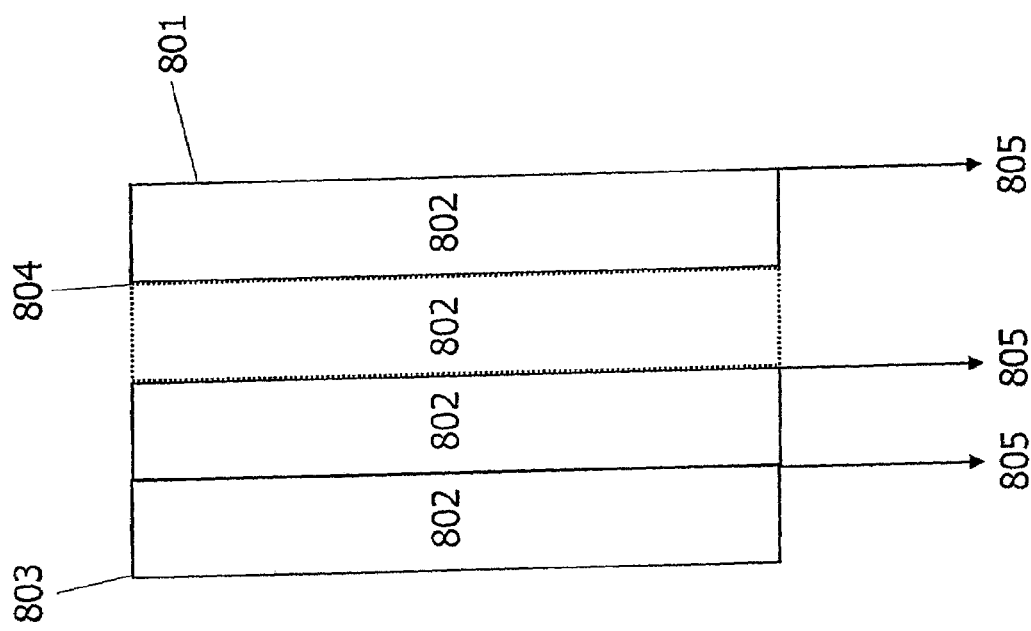
FIG. 8 illustrates the contemporous nature of execution of individual strands and the logical view of side entries into a region.

The structure of an example region is shown in FIG. 8. A region 801 has one or more entry points and one or more exits. It is composed of a number of strands 802. Execution always continues until the last execution word in the region. The set of region exits 805 are the strands that initiate the branch from the region. The main entry point 803 for a region is always to strand 0. When a branch is made to a region a base strand number is specified. This is the first strand that is executed and lower strands are automatically squashed.

In addition to the main entry point 803 a region may have a number of side entries. A side entry is simply an execution of the region that does not start with strand 0. Side entries are created when a previous strand performs a function call and the code after the call is part of the same region. A new strand is created at the point of the call and the return address is set to be a side entry to that strand. An example side entry is shown 804. Side entries are also created when the region construction process encounters complex control flows in where there are control inflow edges to a strand that are outside of the region. In general the number of side entries within a region is minimized, especially for regions within performance critical functions.

Division into Strands

This section describes the detail of how code within a particular region is subdivided into one more strands at the time of code generation. Various heuristic techniques are used to make decisions about the partitioning in order to maximize the potential for parallelism between individual strands within a region.

Each region is subdivided into one more individual strands. A stand represents an ascending sequence of contiguous instructions from the original code. Each successive strand is allocated a higher strand number. Thus in terms of relationship to the original code, the strand order is always the same as the original instruction order.

Each operation in a region belongs to a particular strand. This region may itself consist of multiple basic blocks and therefore multiple branches. Thus some of the code within the region is conditional since it would not be executed if certain branches take particular courses. The scheduler is able to perform "global scheduling" where operations are moved between basic blocks in order to lower execution time and make good use of functional unit resource availability. The conditional evaluation operations can be scheduled like other operations. This allows a great deal of flexibility in the arrangement of code.

The order of operations within a given strand is fixed by the dependencies between operations within that strand. If two operations may depend on each other (and thus their order can affect program results) then the same order must be maintained in the final schedule. The dependency rules between strands can be more flexible, however. In some circumstances operations that are potentially dependent can have their order transposed.

There is a loose correspondence between strands and basic blocks in the original program. However a single basic block can be transformed into multiple strands in some circumstances. This happens if a basic block contains certain types of instructions or is beyond a certain length. Moreover, conditional branches that are normally represented as a single instruction are broken down into two operations in the preferred embodiment. These are the condition evaluation and the branch itself. The branch is considered to be located in a separate basic block from the condition evaluation.

A strand may be terminated by a store instruction. This is done to improve the potential parallelism in the region. The preferred embodiment supports speculative execution of load instructions by boosting them earlier than potentially aliased store instructions. However, this boosting can only be performed if the store and load are in different strands. Splitting strands at the point of a store allows this type of optimisation to be performed when the load operation is in the same basic block. A store may cause a strand split if there are subsequent loads in the same basic block that are potentially (but not definitely) aliased to the store.

Conditional Handing

Figure 24:
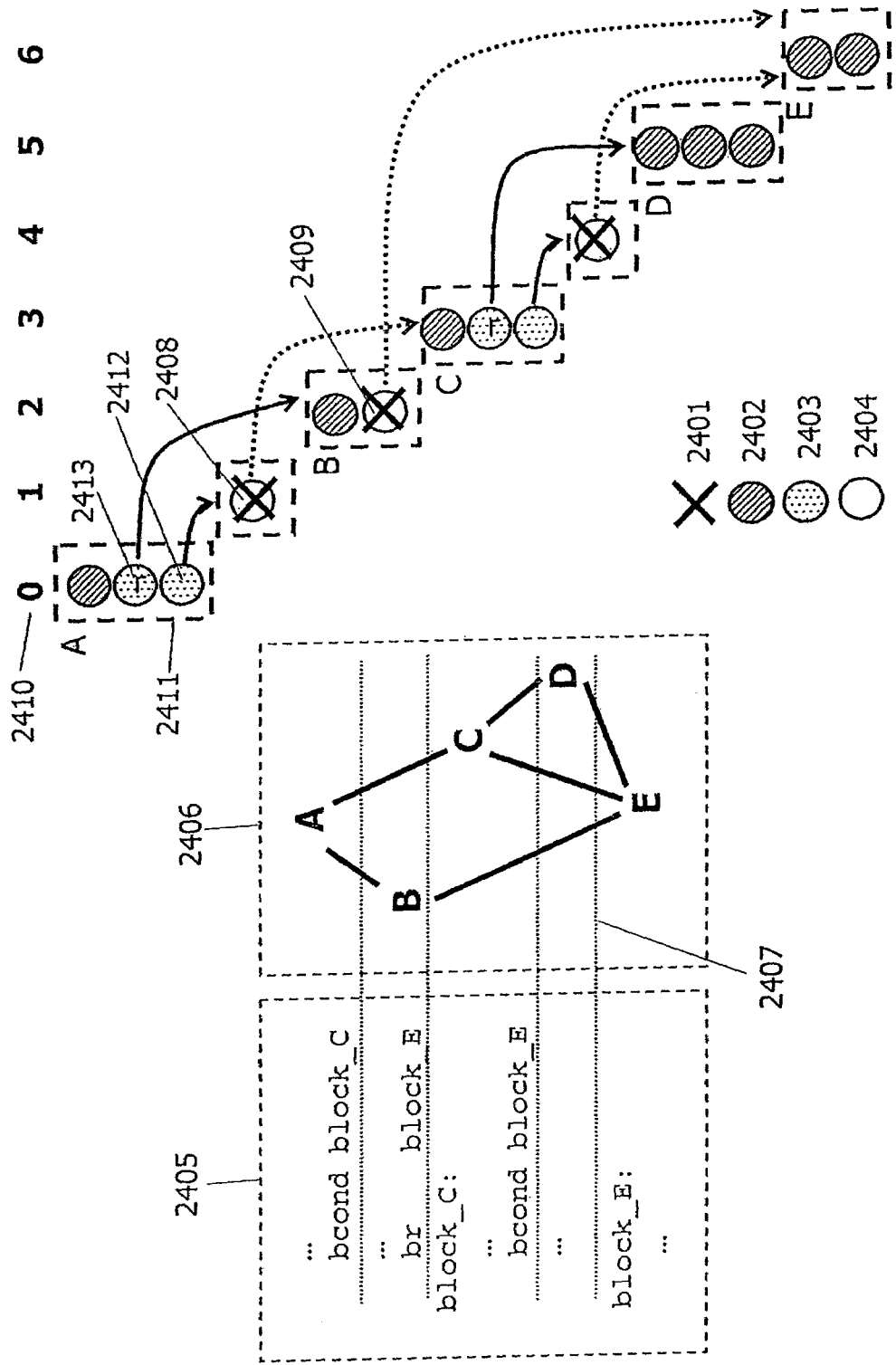
FIG. 24 illustrates the construction of a control and data flow graph from input sequential code and how redundant branches are eliminated as the scope of the code region is determined.

FIG. 24 illustrates how the strand creation process handles conditional code. Some example code is shown 2405. A control flow graph 2406 for that code (extracted from the branch structure) is shown with basic blocks A to E. The delineation of the basic blocks is shown as 2407. Block A is always entered at the start of the region. Blocks B and C are executed on a mutually exclusive basis and are formed from an IF-THEN-ELSE style construct. Block C also has a conditional block D formed from an IF-THEN style construct. Finally all control flow routes merge in basic block E.

Each basic block is allocated a new strand 2411 as illustrated in FIG. 24. Each of the strands is numbered 2410. A strand is composed of a number of individual operations, depending upon the instructions present in the original basic blocks. Basic block A terminates in a conditional branch that jumps over block B into block C. Strand 0 holds operations for block A and two squash operations 2412 and 2413 are generated for the strand. The first squash 2413 controls the entry to strand B (the fall through case of the conditional branch). The second squash 2412 controls the execution of a specially generated strand 1. This strand holds the branch instruction to strand 3 which holds the code for block C.

The key provides information about the meaning of each of the operation types. An ordinary operation is shown as 2402. A squash operation is shown as 2403. A branch operation is shown as 2404. An operation that becomes deleted as part of the processing is shown as 2401.

As the code is first generated it is not known whether a conditional branch will be to code inside of the region or not. The extent of the region is determined as a dynamic process so it is not possible to determine beforehand if an actual branch will be required or not. The region creation process assumes the worst case and generates branch operations. These are then deleted as soon as it is determined that the destination of the branch is within the region. For instance strand 1, which holds a branch 2408 to block C of code in strand 4 is deleted as soon as block C is encountered in the region. If the region was terminated before block C was reached then the branch would remain.

Strand 2, which contains code for block B, includes a branch operation 2409. This is generated from the unconditional branch in the original code at the end of block B. Since the branch is conditional it can remain in the same strand as the rest of the operations for the block and it does not require a separate squash operation. When block E is reached (the destination of the branch) then the branch 2409 can be deleted.

When a branch is deleted and it is the only operation within a strand then the whole strand can be reclaimed. This is important since there is a limit of 16 strands that may be supported and if that limit is reached then the region must be terminated. Reclaiming strands prevents regions being falsely truncated by this limit.

Thus this process converts the control flow present in the original code into a sequence of strands with appropriate squash operations. Conditional blocks of code are converted into conditional strands, allowing much greater scheduling freedom. Only branches to destinations outside of the region remain as branches. This mechanism can convert arbitrary control flow into strand structures and can support the region being terminated at any point during the translation process.

Side Entry Squashes

Figure 9:
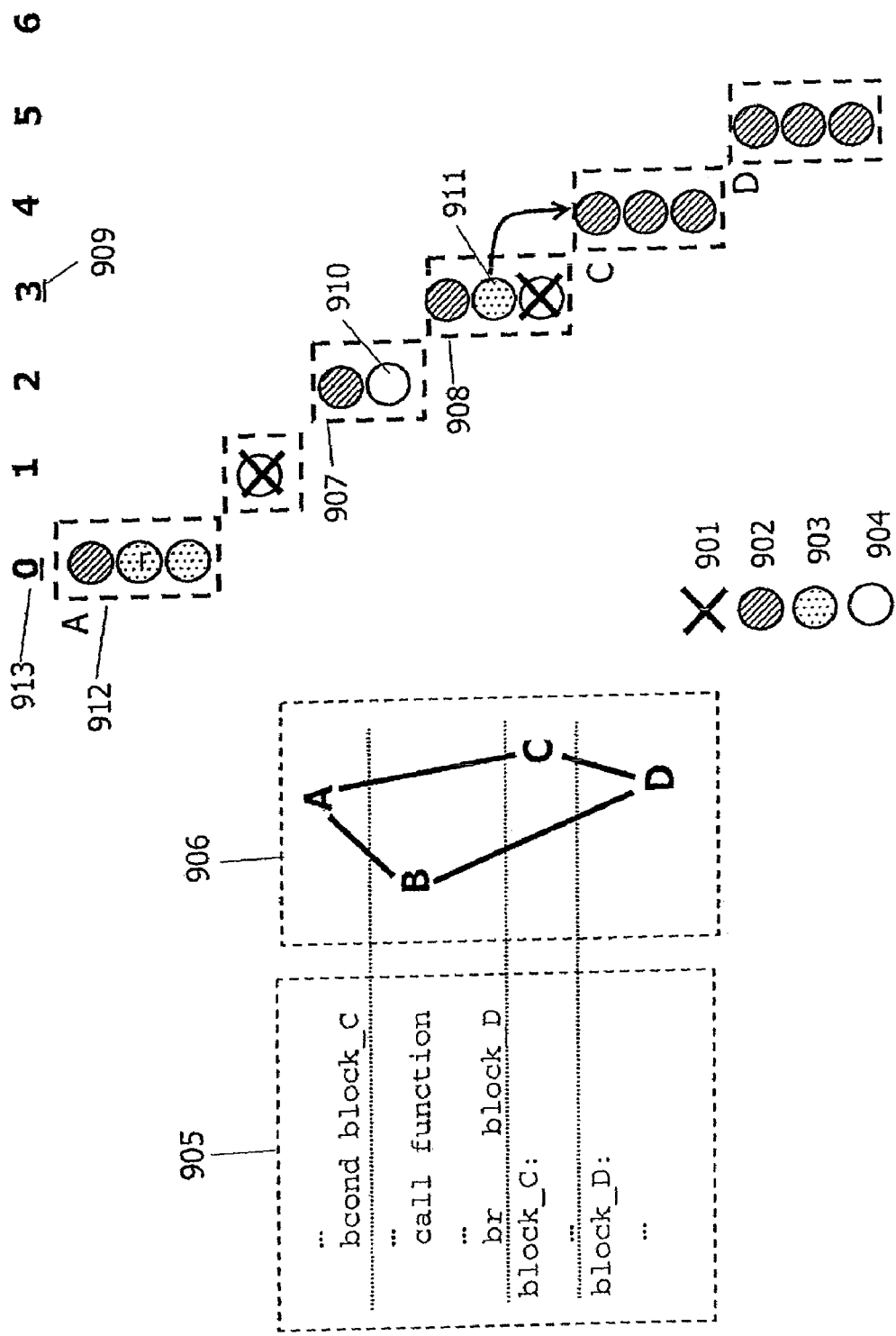
FIG. 9 illustrates how additional squashes are inserted in response to a call being performed within a code region.

If a region has side entries then special unconditional squash operations have to be inserted into the side entry strand to ensure that only reachable strands are executed. This is illustrated in FIG. 9.

The original code 905 forms an IF-THEN-ELSE construct. The control flow graph is shown as 906. Depending on a condition evaluated in block A, either block B or block C will be executed. The code is formed into a region of strands 912 each with an allocated number 913.

The key shows the types of operation. An ordinary operation is 902. A squash operation is 903. A branch operation is 904. An operation that becomes deleted as part of the processing is 901.

Two squash operations in block A disable the appropriate strand depending upon which path is taken. However, block B strand 907 contains a call operation 910. If the path through B is taken then the whole region is executed and a branch is made to the called function. Block D is automatically squashed by the hardware as a branch from block B is taken so all higher numbered strands are squashed.

Block B is divided into two separate strands, 2 and 3. Strand 2 contains the translated code from before the call including the call itself 910. Strand 3 contains the code in block B after the return from the call Strand 3 is a side entry 909 since its address is used in an address link for return from the function. The return branch specifies strand 3 as the first strand to be executed in the region so strands 0 to 2 are automatically disabled and code form them is not repeated. However, strand 4 containing code from block C is enabled but this is should not be executed as the path through B has been taken. A special unconditional squash operation 911 is inserted in strand 3 to disable block C. In general, for each side entry squashes are issued for all higher numbered strands that do not post-dominate the side entry.

Squash Resolution

When the construction of the region is completed the squashes within the region must be finally resolved. At this stage the strands are given their final numbering so that appropriate immediate strand values can be specified for the squash operations. During the construction process itself, strands may be reclaimed as they become empty if an unnecessary branch operation is deleted. Some squashes may be deleted at this stage if they are shown to be redundant.

Figure 25:
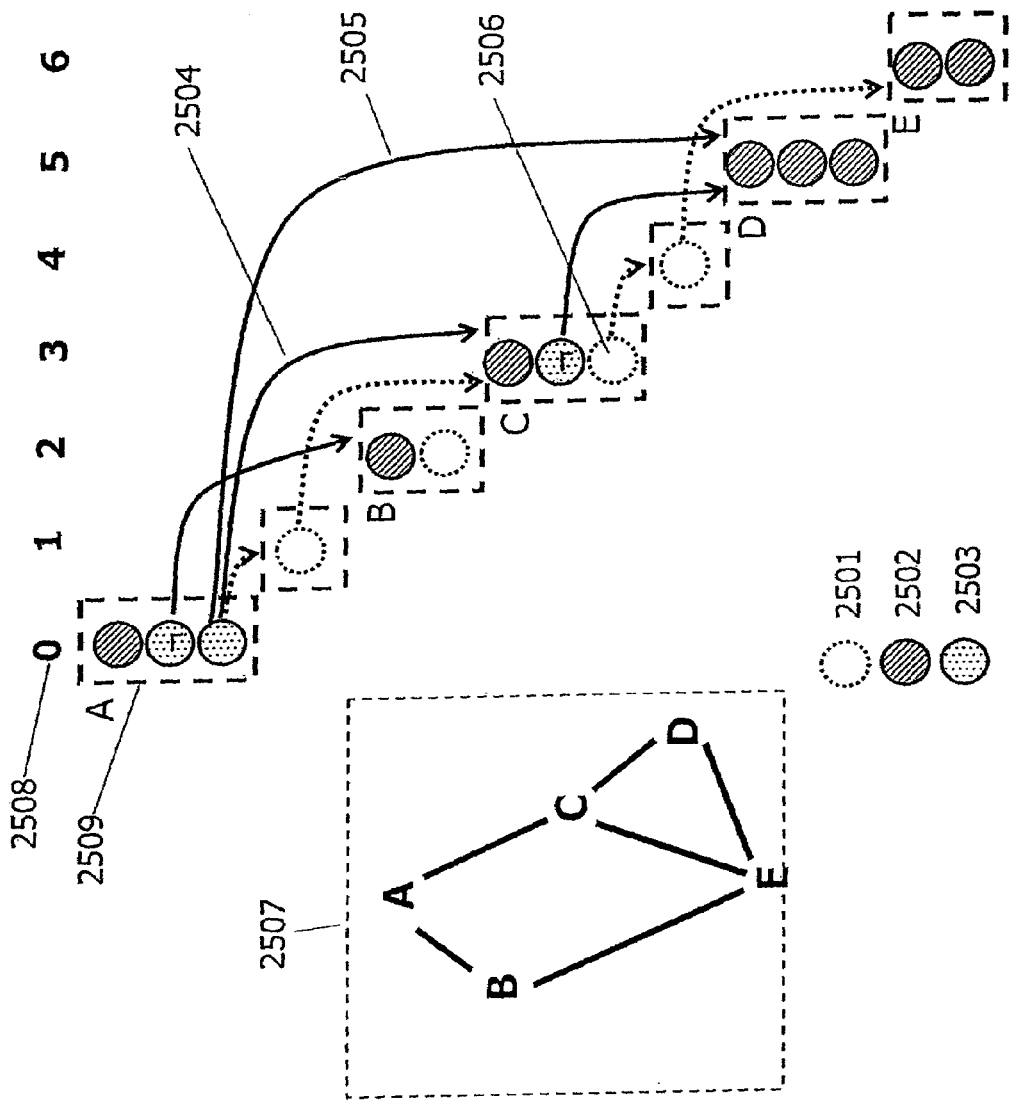
FIG. 25 illustrates how squash numbering is determined on the basis of the pre and post domination relationships of strands.

FIG. 25 shows the set of operations and strand relationships for the example code used to illustrate conditional handling. The example control flow graph is shown as 2507. This is mapped into a region containing a number of strands 2509, each allocated with a number 2508. The key shows the types of operations. An ordinary operation is 2502. A squash operation is 2503. An operation that is deleted by the processing is 2501.

If a branch is deleted then the squash associated with that branch is modified to control the destination strand directly. For instance, the branch to block C has been deleted because block C is within the region. The squash within block A previously used to control that branch is made to control block C directly 2504. The branch and controlling squash 2506 at the end of block C can be deleted as block E post-dominates all blocks in the control flow graph.

Some squashes may be used to control multiple strands. For instance, the squash for block C also controls block D with the same condition 2505. This is because block D is dominated by block C. In other words, the code must pass through block C in order to reach block D. Block D is also controlled by a squash operation in block C but if block C is itself squashed by block A then that squash operation will never be executed. Each squash operation specifies a mask of strands to allow multiple squashes to be initiated by a single operation. If the necessary strands cannot be covered by a single squash operation then the squash resolution stage may insert additional squashes.

In general, a squash operation performed in strand x to control strand y is rewritten to also apply the same condition to all strands z, where z is dominated by x but does not post dominate x. Thus in the example block E is not included in the squashes of block A because all control flows pass through block E so its execution is unconditional. During the region construction process a matrix of strand dependencies is created, allowing domination and post-domination relationships to be determined.

All squashes to control strands that post-dominate the strand in which the squash is performed are deleted. This is the case with the second squash in block D to control block E. Whether the path through C is taken or not, block E is executed. Note that in the case of the squashes in block A, block C does not post-dominate block A (due to the unconditional branch at the end of block B) so the squash for it is retained. This rule allows appropriate code to be generated for differing control topologies of IF-THEN and IF-THEN-ELSE constructs.

Representation of Speculation Opportunities

Weak dependence arcs are used to provide hints to the scheduling algorithms about the ideal ordering of operations. However, unlike normal arcs the dependency rules can be broken and the operations issued out of order. This provides greater flexibility to the scheduler if it is attempting to improve code density by allowing greater scheduling freedom.

In the preferred embodiment the code is formed into a graph representation. This represents the individual operations as nodes in the graph and dependencies between operations as arcs within the graph.

A weak dependence arc has an associated conditional arc. This arc is only activated if the ordering given by the weak dependence arc is broken. Conditional arcs are used to make the issue of certain operations, to compensate for the weak arc violation, conditional.

Figure 4:
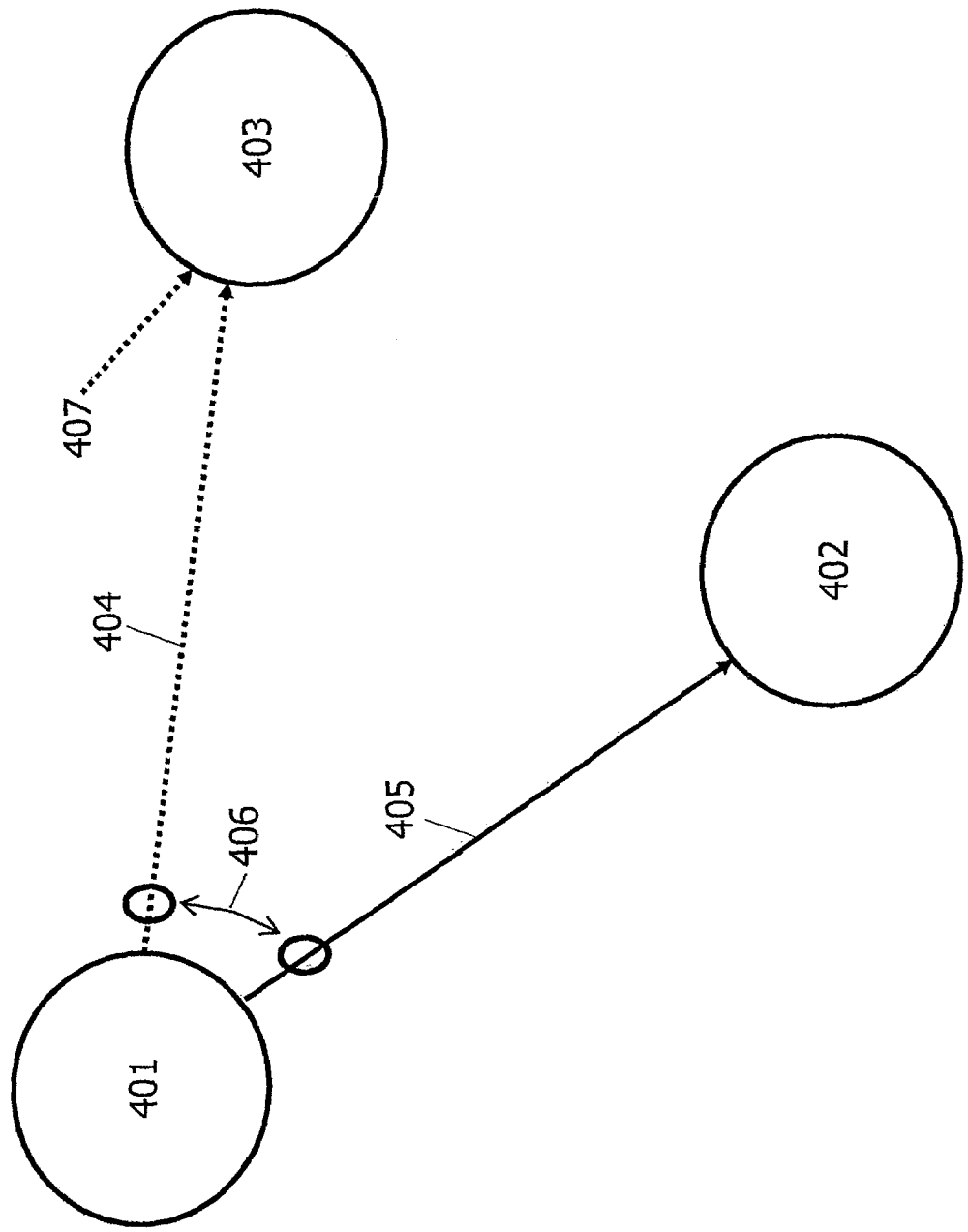
FIG. 4 illustrates how weak and conditional arcs are represented in the graph in order to allow conditional scheduling of alias checking operations.

FIG. 4 illustrates the structure of weak and conditional arcs. A dependee operation 401 has a dependent operation 402. The two operations are connected by a weak arc 405. As shown the weak control arc has an associated 406 conditional arc 404. This conditional arc is dependent upon a conditional operation that is only performed if the weak control arc dependency order is violated. It connects to the conditional operation 403. A single conditional operation may be the dependee of a number of conditional arcs 407. If any of these arcs are activated then the conditional operation is issued.

Memory Dependence Analysis

Memory dependence analysis must be performed between memory access instructions in the code. This involves checking to determine if the access could be aliased with an earlier memory access. The accesses are aliased if they may potentially access the same memory location. If so, and one operation is a load and the other a store, then their ordering cannot be changed in the schedule as that could impact the results generated by the program. Dependence arcs are created between potentially aliased operations to ensure the correct ordering is maintained in the final schedule.

Alias Checking

Alias checks are made with all previous stores in the code that are reachable from the strand of the new operation. If the previous store is from a strand that is on a mutually exclusive control flow path in the region then no dependence arc needs to be generated. For instance, a region may include an IF-THEN-ELSE control flow structure. Memory accesses in the ELSE part of the construct will not have dependency arcs generated with operations from the THEN part as the strand squashing will ensure that both paths are not executed. Thus memory access operations from the ELSE part can be issued before potentially aliased memory access operations from the THEN part.

If a previous store is aliased then the type of dependency arc generated will depend upon a number of factors. If the previous store is within the same strand then an ordinary control arc is generated between the two nodes to ensure they maintain the same order. If the nodes are in different strands then a weak control arc may be generated. An associated conditional arc will also be generated. This mechanism allows memory accesses to be performed out of order if appropriate recovery measures are put in place.

Potentially Aliased Dependence

In this case there is a potential dependency between an earlier store and a later load operation. In general it is unlikely that the two accesses will actually be aliased. In most cases issuing the load earlier than the store will still produce the correct results. However, the architecture must detect the cases in which they are aliased and provide an appropriate recovery mechanism.

Figure 11:
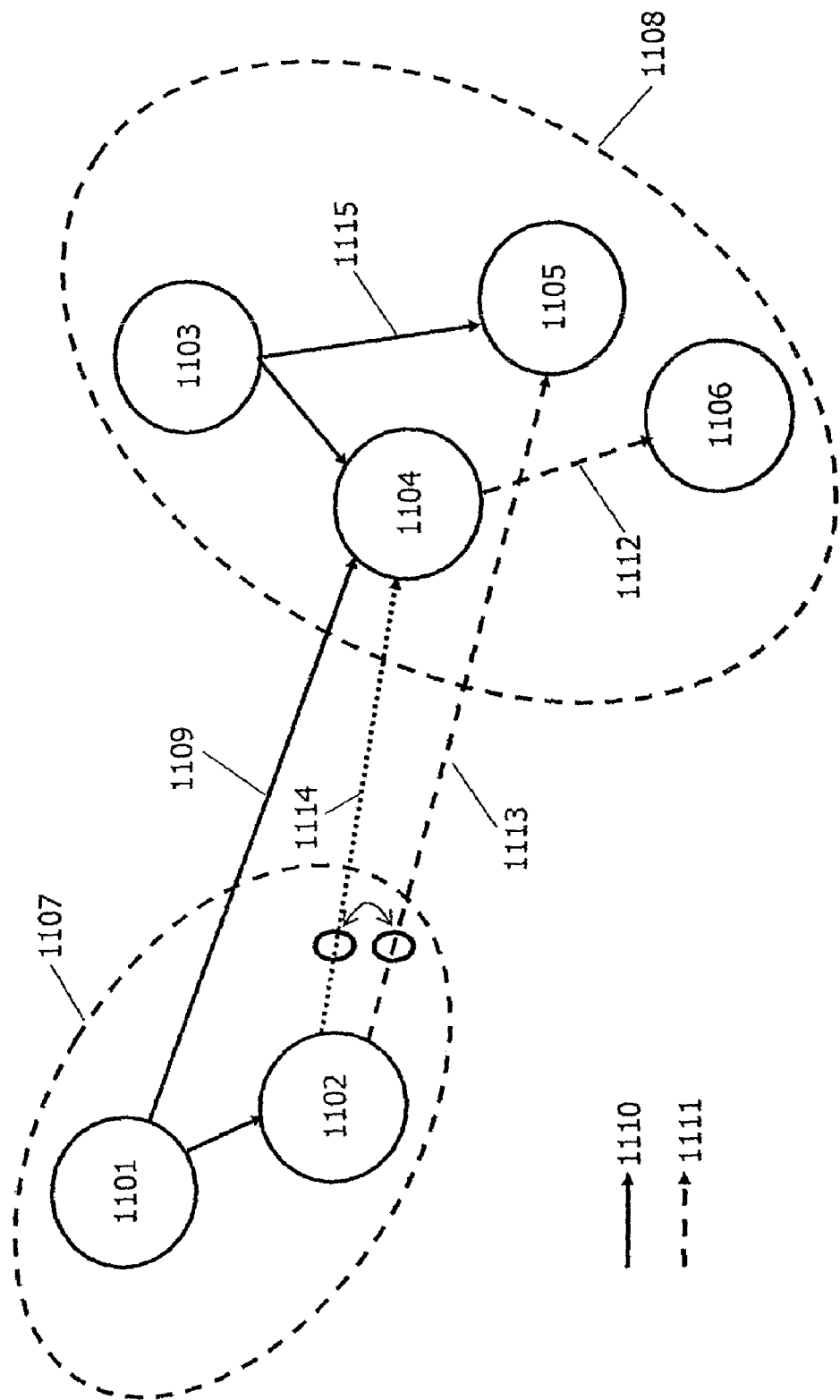
FIG. 11 provides a view of the relationships between the operations associated with the load and a store.

FIG. 11 shows an example of potentially aliased access handling. A weak control arc 1113 is generated between the store 1102 and the later load 1105. A special check hazard operation 1104 is issued in the later strand holding the load. A conditional arc 1114 is created from the store to the check hazard operation. Thus if the load is issued before the store in the schedule then the check hazard operation is issued. To enable this, the load and store must be in different strands. The store is in the logically earlier strand 1107 and the load is in the logically later strand 1108. The figure shows both data arcs 1110 and control arcs 1111.

The check hazard operation requires the addresses generated for the store and load operations. Operation 1101 generates the address for the store. Operation 1103 generates the address for the load via data arc 1115. The check hazard operation obtains those from the same operations that generate them for the store and load. Although the check hazard is issued in the subsequent strand it is able to use the address calculated for the store in the earlier strand. Either the store or load strand can disable a check hazard. If the store address is not valid then the operation is not performed.

The check hazard also has a dependency to the commit point 1106 for the loading strand, via control arc 1112. This is required because the check hazard must be issued in the speculative phase of the loading strand as it has the potential to abort the strand. A check is made to ensure that the address generation for the load is not a dependee of any operations that must be issued in the committed phase of the loading strand. This would not be legal as it would make the graph acyclic, as the check hazard must be issued in the speculative phase.

The check hazard operation simply compares the load and store addresses. If they are not equal then the operation has no effect. Thus if a load is issued earlier than a potential aliased store but the addresses are not actually aliased at run time then execution can continue normally. If the addresses are identical then the strand to which the check hazard belongs (the load strand) is aborted. The later store can then be performed. The region is then re-executed and then check hazard will not be performed as the store address will be generated from a disabled strand. On the re-execution the load obtains the correct data from the store performed previously.

It is understood that there are many possible alternative embodiments of the invention. It is recognized that the description contained herein is only one possible embodiment. This should not be taken as a limitation of the scope of the invention. The scope should be defined by the claims and we therefore assert as our invention all that comes within the scope and spirit of those claims.

The invention claimed is:

1. A method of operating a microprocessor-based computer system, comprising:

dividing a sequence of operations from a single execution thread and across multiple basic blocks into strands by assigning operations from different ones of said basic blocks to different ones of said strands;

numbering all of said strands at compile time to provide an implicit logical time ordering;

explicitly labelling said operations within each of said strands with strand numbering and executing them sequentially according to an original sequential order;

executing certain operations from said strands out of order with respect to their said original sequential order;

providing each of said strands with a predication status that determines whether certain operations from each of said strands should be completed;

composing a plurality of said strands into an executable code region;

making a predication status of each of said strands resettable at the start of the execution of the executable code region;

giving certain of said strands a predication status indicating that certain operations in the executable code region should not be completed;

making the predication status usable to support recovery from data speculative operations between said strands;

repeating execution of the executable code region when a failed data speculation occurs; and setting the predication status of said strands upon a repeat execution such that any of said strands that have already been completely executed are not re-executed.

2. The method according to claim 1 whereby operations in one of said strands are able to modify the predication status of another of said strands.

3. The method according to claim 1 whereby said dividing step is performed from an original sequential stream of instructions.

4. The method according to claim 1 whereby each of said strands is subdivided into a number of phases according to the type of operations that may be issued and operations that modify processor state that are visible outside of the executable code region may only be executed in a final phase of each of said strands.

5. The method according to claim 1 whereby said operations from said strands may be tagged within their execution word format to indicate to which of said strands they belong.

6. The method according to claim 5 whereby a tagged strand number is utilized in control logic of a functional unit to affect execution of said operations.

7. The method according to claim 6 whereby attempting execution from a disabled one of said strands disables operation of said disabled one of said strands.

8. The method according to claim 7 whereby the tagging of said operations may be selective and need only apply to any of said operations that affect processor state that is visible outside of the executable code region.

9. The method according to claim 7 whereby an execution state of each of said strands is distributed to certain functional units by a global bus structure.

10. The method according to claim 9 whereby the execution state of each of said strands is calculated and maintained in a strand control unit.

11. The method according to claim 10 whereby the strand control unit receives requests to modify strand status from one or more functional units.

12. The method according to claim 1 whereby an abort mechanism is utilized to provide a load speculation mechanism allowing memory loads to be executed earlier than a logically preceding store operation that may access a same address.

13. The method according to claim 12 whereby the load speculation mechanism provides recovery from incorrect speculations by repeat execution of the executable code region without the requirement for special compensation code.

14. The method according to claim 12 whereby detection of incorrect load speculations is performed by an explicit functional unit that is used to compare the addresses being used by the load and store operations.

15. The method according to claim 14 whereby address checks are inserted into the strands as a result of insertion of said operations within a graph representation of one of said strands built at code generation time.

16. The method according to claim 1 whereby each of said strands has a committed phase and entry to the committed phase of each strand is performed in the implicit logical time ordering of said strands.

17. The method according to claim 16 whereby an abort of a certain of said strands also causes an abort of all of said strands which are logically later.

18. The method according to claim 16 whereby a branch executed from a particular of said strands causes all of said strands which are logically later to be disabled.

19. The method according to claim 18 whereby branches may be issued out of their original sequential order but are suitably resolved and no actual branch is performed until the end of the executable code region is reached.

20. The method according to claim 1 whereby said operations from different of said strands may be interspersed in an execution word for the purposes of improving code density.

21. The method according to claim 1 whereby an explicit operation may be issued that disables a set of said strands depending on whether they are logically the first being executed.

22. The method according to claim 1 whereby a strand mechanism is used to convert conditional blocks of code constructed using branches into separate operations strands that do not require a branch.

23. The method according to claim 1 whereby an execution status of said strands upon entry to the executable code region may be set from a parameter provided by a preceding branch operation.

24. The method according to claim 23 whereby an entry mechanism may be used to reposition a branch to a logically later of said strands in the executable code region.

25. The method according to claim 1 whereby scheduling and construction of said strands is influenced by profiling of the executable code region.

26. The method according to claim 25 whereby a strand ordering of said strands is used to implement static speculation that provides performance benefits whilst seeking to minimize the chances of an incorrect speculation that requires recovery.

27. A microprocessor for executing instructions using the method of claim 1.

* * * * *